United States Patent
Shigematsu et al.

(10) Patent No.: US 9,388,891 B2
(45) Date of Patent: Jul. 12, 2016

(54) MULTI-SHAFT DRIVE DEVICE

(75) Inventors: Ryohei Shigematsu, Yokohama (JP);
Takafumi Hirata, Yokohama (JP);
Takahiro Fujii, Yokohama (JP); Kiyoshi Nakajima, Yokohama (JP); Shinji Iino,
Yokohama (JP); Soichi Nakayama,
Yokohama (JP)

(73) Assignee: NHK SPRING CO., LTD.,
Yokohama-Shi (JP)

( * ) Notice: Subject to any disclaimer, the term of this patent is extended or adjusted under 35 U.S.C. 154(b) by 371 days.

(21) Appl. No.: 14/001,665

(22) PCT Filed: Jan. 26, 2012

(86) PCT No.: PCT/JP2012/051712
§ 371 (c)(1),
(2), (4) Date: Aug. 26, 2013

(87) PCT Pub. No.: WO2012/117780
PCT Pub. Date: Sep. 7, 2012

(65) Prior Publication Data
US 2013/0327180 A1   Dec. 12, 2013

(30) Foreign Application Priority Data

Feb. 28, 2011  (JP) ................... 2011-042118
Feb. 28, 2011  (JP) ................... 2011-042125

(51) Int. Cl.
*F16H 37/06* (2006.01)
*B60N 2/02* (2006.01)
*F16H 63/30* (2006.01)

(52) U.S. Cl.
CPC ............ *F16H 37/065* (2013.01); *B60N 2/0296* (2013.01); *F16H 63/304* (2013.01); *F16H 2063/3056* (2013.01); *Y10T 74/19019* (2015.01)

(58) Field of Classification Search
CPC .......... F16H 63/304; F16H 2063/3056; F16H 37/065
USPC ................................ 74/664, 665 A
See application file for complete search history.

(56) References Cited

U.S. PATENT DOCUMENTS 1,082,105 A * 12/1913 Anderson ................. F16H 1/16
                                                     192/129 R
4,299,316 A * 11/1981 Reinmoeller ........ B60N 2/0224
                                                     192/30 W (Continued)

FOREIGN PATENT DOCUMENTS

| CN | 103249964 | 8/2013 |
| JP | 54-41898 | 12/1977 |
| JP | 6-156123 A | 6/1994 |

OTHER PUBLICATIONS

Offices Action dated May 6, 2015 in Chinese Application No. 201280010842.4.

*Primary Examiner* — William Kelleher
*Assistant Examiner* — Emily Cheng
(74) *Attorney, Agent, or Firm* — Knobbe Martens Olson & Bear LLP

(57) ABSTRACT

A multi-shaft drive device is provided that is capable of obtaining an appropriate backlash in an enmeshed state of an output side bevel gear and an input side bevel gear. An output side bevel gear (35) that is biased in the direction of an input side bevel gear by a coil spring contacts a shaft support bush attached to a wall portion (17) in an enmeshed state with the input side bevel gear. A bias direction stroke end of the output side bevel gear (35) is accordingly restricted. Moreover, the wall portion (17) is provided to a gear holder (15) fixed to a device case (10) that supports the input side bevel gear, thereby enabling the axial direction position of the output side bevel gear (35) to always be positioned at a uniform position to enmesh appropriately with the input side bevel gear.

9 Claims, 12 Drawing Sheets

(56) References Cited

U.S. PATENT DOCUMENTS

| | | | | |
|---|---|---|---|---|
| 5,163,734 A * | 11/1992 | Hakansson | B60N 2/0224 248/396 |
| 6,126,132 A * | 10/2000 | Maue | B60N 2/0248 248/429 |
| 6,553,866 B1 * | 4/2003 | Ursel | B60N 2/0224 297/330 |
| 6,983,990 B2 * | 1/2006 | McMillen | B60N 2/0232 297/284.4 |
| 7,009,353 B2 * | 3/2006 | Dewert | A47C 20/041 248/429 |
| 7,313,982 B2 * | 1/2008 | Wisner | B60N 2/0232 192/38 |
| 7,770,972 B2 * | 8/2010 | Popa | B60N 2/0296 297/284.4 |
| 2010/0139453 A1 * | 6/2010 | Chu | B65H 3/0669 74/664 |
| 2011/0278125 A1 * | 11/2011 | Chevalier | B60N 2/0232 192/48.1 |

\* cited by examiner (a)

(b)

MULTI-SHAFT DRIVE DEVICE

CROSS-REFERENCE TO RELATED APPLICATIONS

This application is the U.S. National Phase under 35. U.S.C. §371 of International Application PCT/JP2012/051712, filed Jan. 26, 2012, which claims priority to Japanese Patent Application No. 2011-042118, filed Feb. 28, 2011, and Japanese Patent Application No. 2011-042125, filed Feb. 28, 2011. The disclosures of the above-described applications are hereby incorporated by reference in their entirety. The International Application was published under PCT Article 21(2) in a language other than English.

TECHNICAL FIELD

The present invention relates to a multi-shaft drive device that is preferably applied to for example an electric vehicle seat and that drives plural output shafts with a single motor.

BACKGROUND ART

Many vehicle seats are of a type enabling position adjustment of plural portions so as to suit the build and posture of an occupant, the position adjustment includes, for example, sliding the overall seat in the front-rear direction, moving the height of the seat face up and down, or reclining the seatback (backrest). Such adjustment of the plural movable portions may be performed manually, however more convenient electric seats are provided that use the drive of a motor to perform adjustments.

In order to independently drive respective movable portions, a configuration wherein motors are individually coupled to respective drive shafts that are each coupled to a movable portion may be considered, however this would increase the number of motors. Since it is more efficient for a single motor to drive plural output shafts, proposals have been made wherein the power of a motor is transmitted through clutches to respective output shafts coupled to the plural movable portions, and each of the movable portions is selectively driven by connecting and disconnecting the clutches (see for example Japanese Patent Application Laid-Open (JP-A) No. H6-156123). Such known multi-shaft drive devices include driven side bevel gears respectively provided to plural output shafts so as to be capable of moving in the axial direction. The driven side bevel gears are provided in a biased state capable of enmeshing with drive side bevel gears on a motor shaft. The driven side bevel gears are moved towards and away from the drive side bevel gears by cams that press the driven side bevel gears, thereby switching between power transmission paths (Japanese Utility Model Publication (JP-Y) No. S54-41898).

Patent Document 1: Japanese Patent Application Laid-Open (JP-A) No. H6-156123
Patent Document 2: Japanese Utility Model Publication (JP-Y) No. S54-41898

DISCLOSURE OF INVENTION

Technical Subject

In multi-shaft drive devices such as that disclosed in the above Patent Document 2, when driven side bevel gears (output side bevel gears) enmesh with drive side bevel gears (input side bevel gears), there is a need to perform power transmission at an appropriate enmeshing position in an axial direction with an appropriate amount of backlash.

In consideration of the above circumstances, a subject of the present invention is to provide a multi-shaft drive device capable of obtaining an appropriate backlash in an enmeshed state between an output side bevel gear and an input side bevel gear.

Solution Addressing Subject

A multi-shaft drive device of a first aspect includes: plural input side bevel gears that are supported so as to be rotatable with respect to a case and that rotate in response to transmission of power of a motor; plural output side bevel gears that are provided corresponding to each individual of the plural input side bevel gears, that are supported so as to be rotatable with respect to the case and to be capable of projecting forward or retreating with respect to the input side bevel gears, that are biased in a direction to enmesh with the input side bevel gears, and that are respectively coupled to plural movable mechanisms provided to a vehicle such that rotation force can be individually transmitted to the respective movable mechanisms; a selector that is provided so as to be movable with respect to the case and capable of making sliding contact with the plural output side bevel gears, that enmeshes a selected output side bevel gear out of the plural output side bevel gears with the corresponding input side bevel gear, and that separates the other output side bevel gears from the corresponding input side bevel gears; and a stopper that is provided at the case or at a retention member fixed to the case, that makes contact with the output side bevel gear that is enmeshed with the input side bevel gear and that restricts a stroke end in a bias direction of the output side bevel gear.

In the first aspect, the selector that is provided so as to be movable with respect to the case and capable of making sliding contact with the plural output side bevel gears, enmeshes the selected output side bevel gear out of the plural output side bevel gears with the corresponding input side bevel gear, and separates the other output side bevel gears from the corresponding input side bevel gears. The power of the motor is transmitted through the input side bevel gear to the output side bevel gear that is enmeshed with the input side bevel gear, rotating the output side bevel gear. The movable mechanism coupled to the output side bevel gear is accordingly driven.

Note that, the plural output side bevel gears are biased in the direction to enmesh with the corresponding input side bevel gears, and the selected output side bevel gear that is enmeshed with the input side bevel gear makes contact with the stopper. The stroke end in the bias direction of the output side bevel gear is accordingly restricted. Moreover, the stopper is provided at the case or at the retention member fixed to the case that supports the input side bevel gear. The output side bevel gear can accordingly be positioned at a uniform position in the axial direction thereof so as to enmesh appropriately with the input side bevel gear. An appropriate backlash can accordingly be obtained in the enmeshed state between the output side bevel gear and the input side bevel gear.

A multi-shaft drive device of a second aspect is the first aspect, wherein configuration is made such that the selected output side bevel gear is separated from the selector in an enmeshed state of the selected output side bevel gear with the corresponding input side bevel gear.

In the second aspect, in the enmeshed state of the selected output side bevel gear with the corresponding input side bevel gear, namely in a contact state between the selected output side bevel gear and the stopper, the output side bevel gear is separated from the selector. Accordingly, the output side bevel gear can be prevented from making sliding contact with the selector when the output side bevel gear is rotating, thereby enabling wear to the output side bevel gear or the selector accompanying sliding contact to be prevented. The durability of the output side bevel gear and the selector can accordingly be increased.

A multi-shaft drive device of a third aspect is either the first aspect or the second aspect, wherein configuration is made such that the selected output side bevel gear and the stopper make face-to-face contact in an enmeshed state of the selected output side bevel gear with the corresponding input side bevel gear.

In the third aspect, in the enmeshed state of the selected output side bevel gear and the corresponding input side bevel gear, namely in a contact state between the selected output side bevel gear and the stopper, the output side bevel gear and the stopper make face-to-face contact with each other. Face pressure arising at contact portions between the output side bevel gear and the stopper during rotation of the output side bevel gear can accordingly be managed to an appropriate permissible value or below, thereby enabling the amount of wear to the output side bevel gear and the stopper to be suppressed. Moreover, localized wear and uneven wear of the output side bevel gear and the stopper can be prevented, thereby enabling the durability of the output side bevel gear and the stopper to be increased.

A multi-shaft drive device of a fourth aspect is any one of the first aspect to the third aspect, wherein: the stopper includes a wall portion provided at the case or at the retention member; and a contact portion is provided to a leading end in a bias direction of the output side bevel gear and is supported by the wall portion so as to be rotatable with respect to the wall portion and capable of moving along a thrust direction in a state in which the contact portion penetrates a through hole formed in the wall portion.

In the fourth aspect, the wall portion provided to the case or to the retention member supports the output side bevel gear so as to be rotatable and capable of moving along a thrust direction, and also restricts the stroke end in the bias direction of the output side bevel gear. Namely, the wall portion (stopper) that restricts the stroke end of the output side bevel gear also has a function of providing shaft support to the output side bevel gear, enabling configuration to be simplified in comparison to when a stopper and a shaft support portion are provided separately.

A multi-shaft drive device of a fifth aspect is the fourth aspect, wherein a leading end of the contact portion of the output side bevel gear makes sliding contact with the selector.

In the fifth aspect, the leading end, which penetrates the through hole in the wall portion provided to the case or to the retention member, of the contact portion of the output side bevel gear makes sliding contact with the selector, whereby the output side bevel gear projects forwards or retreating with respect to the input side bevel gear. Namely the output side bevel gear separates from the input side bevel gear when the contact portion is pressed towards the opposite side to the input side bevel gear by the selector, and the output side bevel gear enmeshes with the input side bevel gear under a biasing force on release of the pressing of the contact portion. Configuration of the selector can accordingly be simplified by configuring the selector to simply press or release the pressing of the contact portion.

A multi-shaft drive device of a sixth aspect is either the fourth aspect or the fifth aspect, wherein the wall portion is formed at the retention member.

In the sixth aspect, the wall portion that supports the output side bevel gear and restricts the stroke end in the bias direction of the output side bevel gear is formed at the retention member that is fixed to the case. Configuration of the case can accordingly be simplified. During manufacture of the multi-shaft drive device, the retention member (wall portion) and the output side bevel gears can be assembled to the case separately to each other, thereby enabling an assembly operation to be more flexible.

A multi-shaft drive device of a seventh aspect is the sixth aspect, wherein the wall portion is formed with an open cross-section profile open to an output side bevel gear side, and the wall portion includes a pair of reinforcement portions formed so as to face both sides in a radial direction of the output side bevel gear.

In the seventh aspect, the wall portion formed at the retention portion includes the pair of reinforcement portions formed so as to face the both sides in the radial direction of the output side bevel gear. The pair of reinforcement portions can accordingly suppress deformation when the wall portion is being pressed by the output side bevel gear that is biased towards the direction to enmesh with the input side bevel gear. The output side bevel gear can accordingly be positioned at a uniform position in the axial direction thereof with high precision due to contacting the wall portion. Backlash can accordingly be stabilized with a high degree of precision in the enmeshed state of the output side bevel gear and the input side bevel gear.

A multi-shaft drive device of an eighth aspect is either the fourth aspect or the fifth aspect, wherein the wall portion is formed at the case.

In the eighth aspect, the wall portion that provides shaft support to the output side bevel gear and also restricts the stroke end in the bias direction of the output side bevel gear is provided at the case that supports the output side bevel gear and the input side bevel gear. The output side bevel gear can accordingly be positioned with high precision with respect to the input side bevel gear, enabling backlash to be stabilized with a high degree of precision in the enmeshed state of the output side bevel gear and the input side bevel gear.

A multi-shaft drive device of a ninth aspect is the eighth aspect, wherein: the output side bevel gear is mounted so as to be rotatable together as a unit with an output shaft connected to the movable mechanism and be capable of sliding in the thrust direction with respect to the output shaft; and the case further includes a support portion that rotatably supports the output shaft, and a pair of side wall portions integrally formed to the wall portion and the support portion and formed so as to face both sides in a radial direction of the output side bevel gear.

In the ninth aspect, the output side bevel gear is enclosed by the wall portion, the support portion and the pair of side wall portions that all of them are formed to the case, and the stroke end is restricted by the contact with the wall portion, such that the output side bevel gear always enmeshes appropriately with the input side bevel gear. The wall portion is pressed by the output side bevel gear that is biased in the direction of the input side bevel gear, however stress received due to this pressing is not concentrated in the wall portion and is dispersed around the overall case through the pair of side wall portions and the support portion due to integrating the pair of side wall portions and the support portion, enabling deformation of the wall portion to be suppressed. Due to contacting the wall portion, the output side bevel gear can be positioned at a uniform position in the axial direction with high precision, enabling backlash to be stabilized with a high degree of precision in the enmeshed state of the output side bevel gear and the input side bevel gear.

Advantageous Effects of Invention

The present invention exhibits the advantageous effect of providing a multi-shaft drive device that is capable of obtaining an appropriate backlash in an enmeshed state of the output side bevel gear and the input side bevel gear.

DESCRIPTION OF EMBODIMENTS

First Exemplary Embodiment
Explanation follows regarding a first exemplary embodiment of the present invention with reference to FIG. 1 to FIG. 16.

Figure 1:
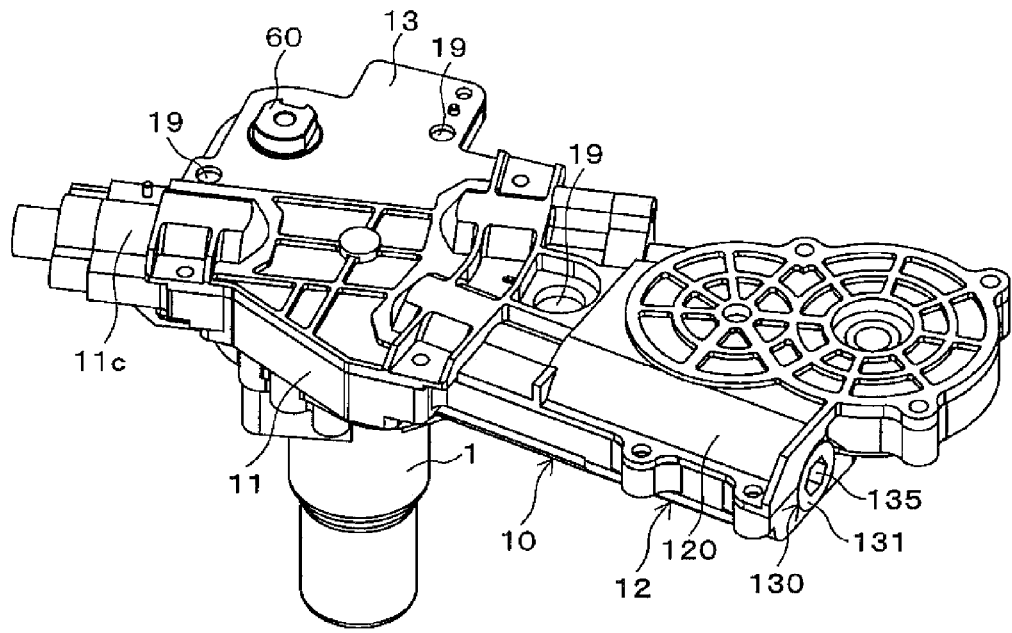
FIG. 1 is an overall perspective view illustrating a multi-shaft drive device according to a first exemplary embodiment of the present invention.

(1) Multi-shaft Drive Device Configuration
FIG. 1 is a perspective view illustrating a multi-shaft drive device according to the first exemplary embodiment. The multi-shaft drive device selectively drives plural movable mechanisms of an electric seat in a vehicle, not illustrated in the drawings, with a single motor 1. In the present example, there are 3 movable mechanisms, namely a lifter mechanism that adjusts a height of a seat face, a reclining mechanism that adjusts an angle of a seatback (backrest portion), and a slide mechanism that adjusts a front-rear position of the seat. These movable mechanisms are actuated by forward and reverse rotation of drive shafts provided to each mechanism.

Figure 2:
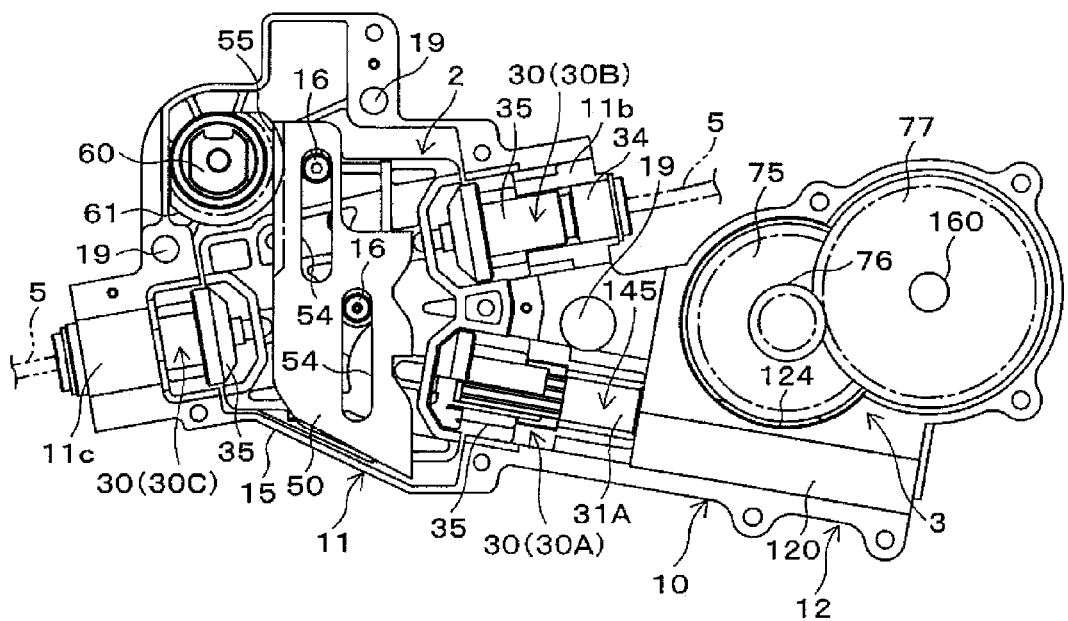
FIG. 2 is an overall plan view illustrating the multi-shaft drive device in a state with a cover removed.
Figure 3:
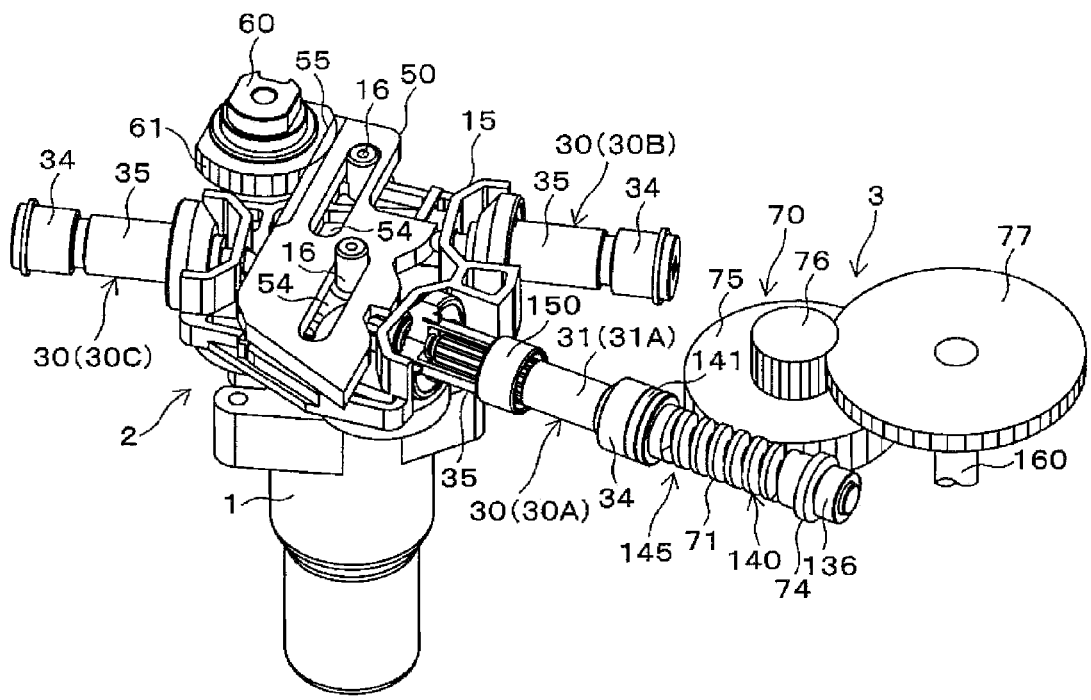
FIG. 3 is a perspective view illustrating the multi-shaft drive device in a state with a device case and the cover removed.
Figure 4:
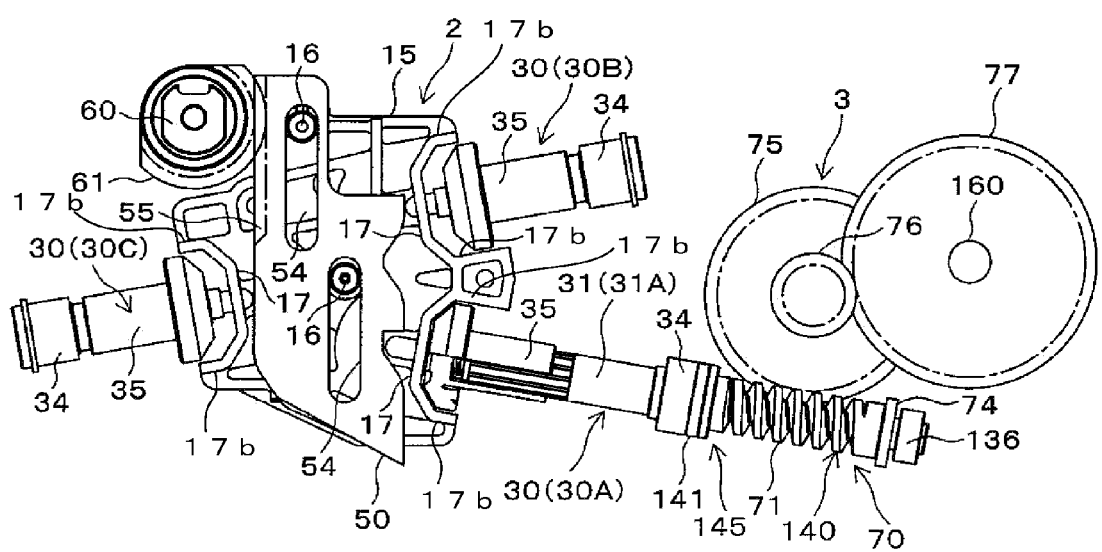
FIG. 4 is a plan view of FIG. 3.

A device case (case) 10 and a cover 13 that covers the device case 10 can be seen in FIG. 1. FIG. 2 is a plan view illustrating a removed state of the cover 13. FIG. 3 is a perspective view illustrating the inside of the device and the motor 1 with the device case 10 and the cover 13 removed, and FIG. 4 is a plan view corresponding to FIG. 3.

As illustrated in FIG. 2, the device case 10 includes a clutch unit case portion 11 and a gearbox case portion 12 to be molded integrally. The clutch unit case portion 11 and the gearbox case portion 12 respectively house a clutch unit 2 and a gearbox 3. The motor 1 is fixed to a back face of the clutch unit case portion 11 with a motor shaft 1a to which a pinion 1b is fixed in a state projecting inside the device case 10.

Figure 5A:
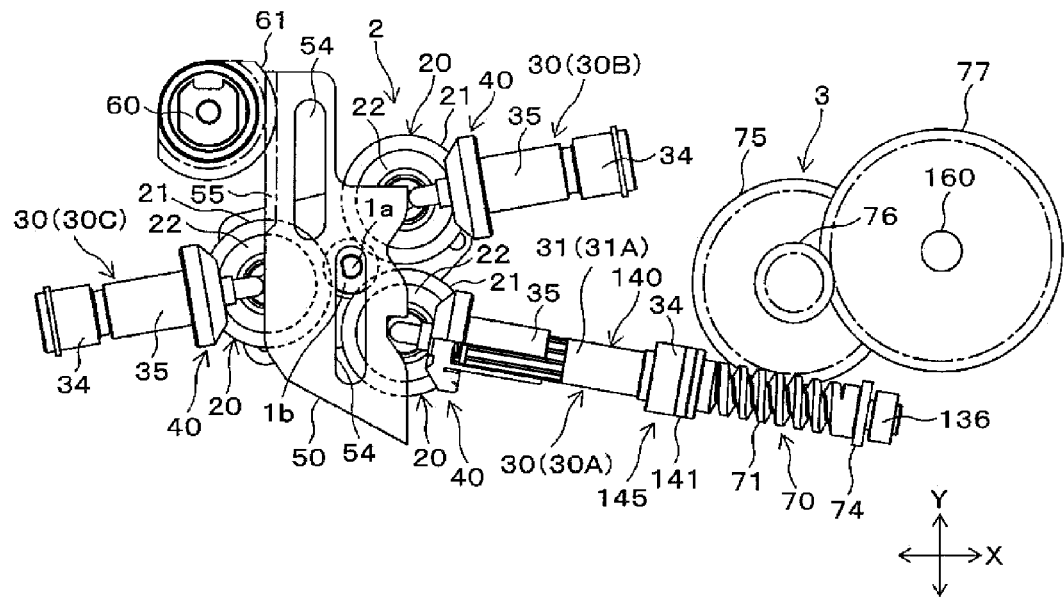
FIG. 5A is a plan view.
Figure 5B:
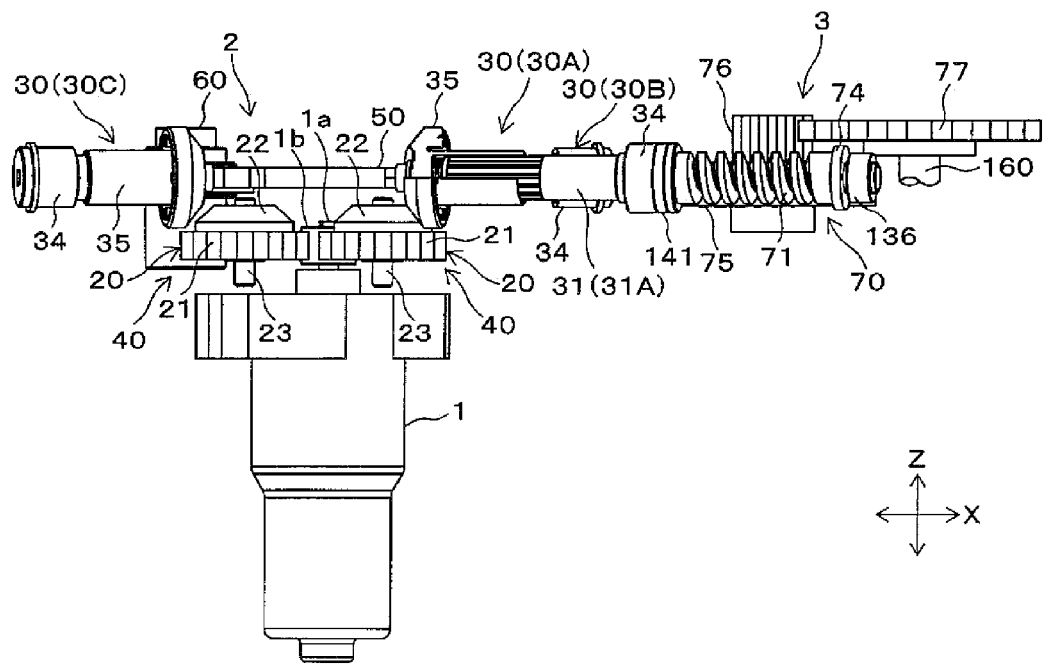
FIG. 5B is a side view, respectively illustrating a state in which a gear holder illustrated in FIG. 4 has been removed.

As illustrated in FIGS. 5, the clutch unit 2 includes: plural input portions 20 that transmit power of the motor 1, provided to each of the mechanisms described above; plural output portions 30 that are individually provided corresponding to each of the plural input portions 20, and that are provided with output shafts 31 that connect to each of the mechanisms described above through power transmission unit; clutch mechanisms 40 that are provided for each of the input portions 20 and the output portions 30, and that connect and disconnect the power transmission from the input portions 20 to each of the output shafts 31; a selector (switching portion) 50 that selectively places the clutch mechanisms 40 in a connected state; and an operation shaft 60 that actuates the selector 50.

The plural input portions 20 are disposed to the periphery of the pinion 1b. The input portions 20 are formed in circular plate shapes, and each includes an input gear 21 configured by a flattened cog that enmeshes with the pinion 1b and an input side bevel gear 22 formed on one end face of the input gear 21. The input gear 21 and the bevel gear 22 are formed coaxially to each other on an input shaft 23. The input portions 20 are rotatably supported on the clutch unit case portion 11 through the input shafts 23 that run along a Z direction parallel to the motor shaft 1a. Note that configuration may be made such that the input gear 21 and the input side bevel gear 22 are indirectly supported on the device case 10 through another member rather than being directly supported on the device case 10.

Figure 6:
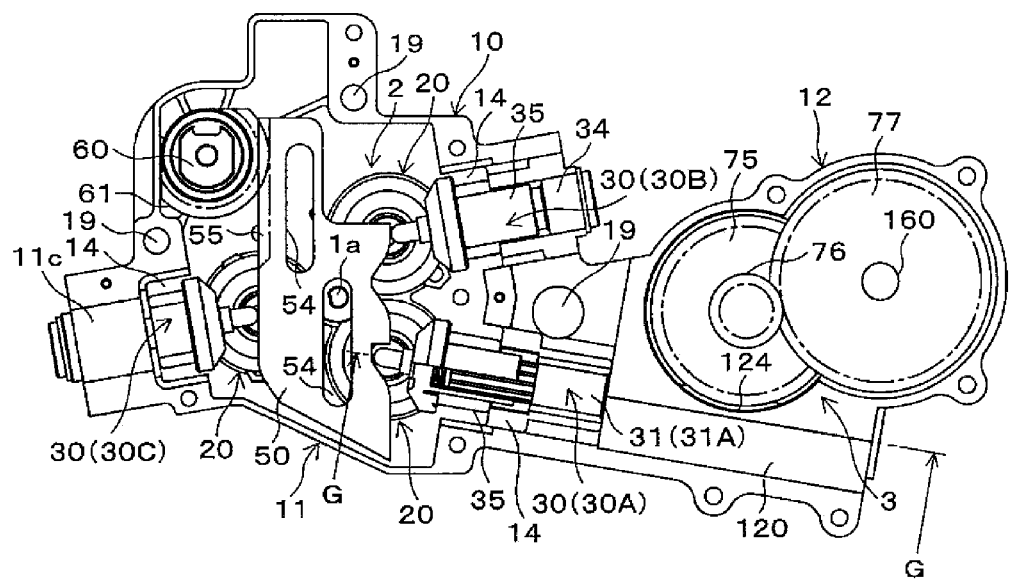
FIG. 6 is a drawing illustrating a state in which the gear holder illustrated in FIG. 2 has been removed.

A plate shaped gear holder (retention member) 15 can be seen in FIG. 4. As illustrated in FIG. 3, the gear holder 15 is fixed inside the clutch unit case portion 11 of the device case 10 covering each of the input portions 20. Together with the clutch unit case portion 11, the gear holder 15 supports the plural input side bevel gears 22. Two guide projections 16 projecting in the Z direction are formed at specific locations of the gear holder 15. FIG. 6 is a plan view illustrating a state in which the gear holder 15 has been removed.

Figure 7:
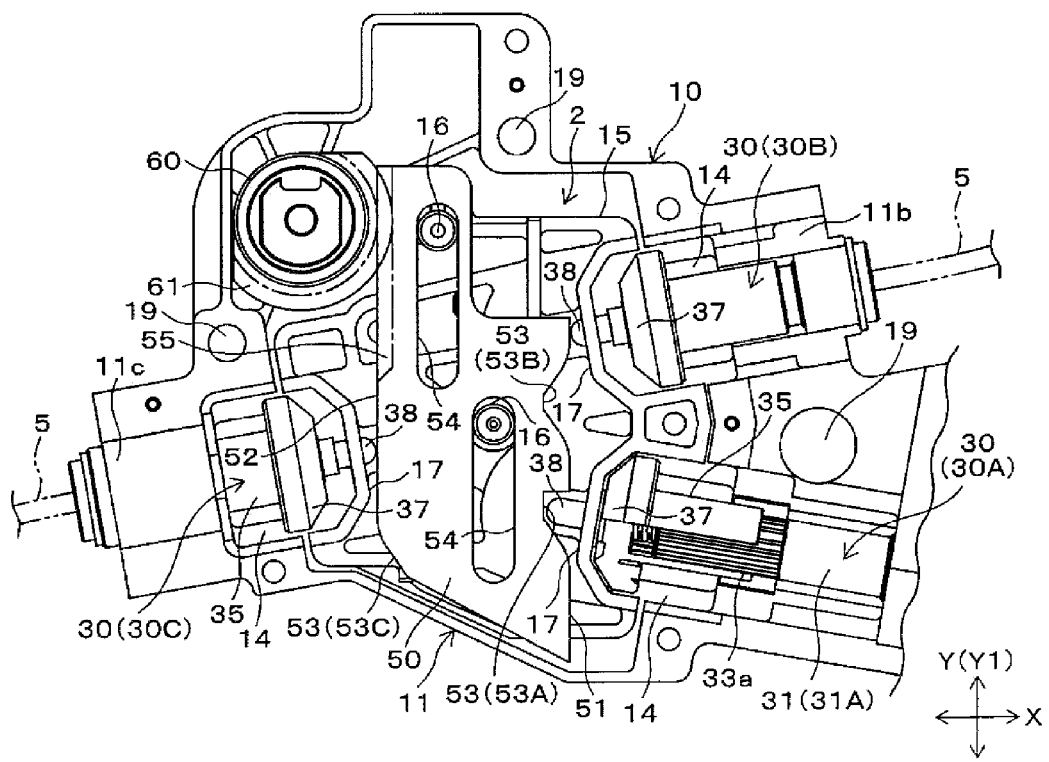
FIG. 7 is a plan view illustrating a clutch unit of the multi-shaft drive device.

FIG. 7 illustrates the clutch unit 2. As illustrated in FIG. 7, the selector 50 is a substantially rectangular plate shaped member that is long in the Y direction. The selector 50 is formed with two guide holes 54 corresponding to the guide projections 16 and extending in the Y direction. The respective guide projections 16 are inserted into the guide holes 54. The selector 50 is supported on the gear holder 15 so as to be capable of sliding in the Y direction guided by the guide projections 16.

Out of the two side faces of the selector 50 running in the Y direction, the side face on the right hand side in FIG. 7 is formed with a first cam face 51. A lower side of the side face on the left hand side is formed with a second cam face 52, and an upper side of the side face on the left hand side is formed with a rack 55 with a row of teeth running in the Y direction. The operation shaft 60 is rotatably supported inside the clutch unit case portion 11 with the rotation axis oriented in the Z direction. The operation shaft 60 is formed with a pinion 61 that enmeshes with the rack 55. An operation member such as a dial or a lever, not illustrated in the drawings, is fixed to the operation shaft 60 at the outside of the cover 13. When the operation shaft 60 is rotated through the operation member, the selector 50 is moved by the rotating pinion 61 back and forth along the Y direction through the rack 55, according to the rotation direction of the operation shaft 60.

The motor 1 is switched ON/OFF and rotation direction is selected by a switch, not illustrated in the drawings. All of the input portions 20 rotate when the motor 1 is actuated. The switch is preferably provided to the above operation member since this enables actuation of the clutch unit 2, namely selection of the movable mechanism, to be performed in a single operation together with the switching ON/OFF of the motor 1.

As illustrated in FIG. 7, the output portions 30 are disposed facing the respective cam faces 51, 52 on both X direction sides of the selector 50. In the present example, two of the output portions 30 (a first output portion 30A and a second output portion 30B) are disposed separated from each other in the Y direction facing the first cam face 51, and one of the output portions 30 (a third output portion 30C) is disposed facing the second cam face 52. The output portions 30 include the output shafts 31, and each of the output portions 30 is respectively housed in a housing portion 14 provided inside the clutch unit case portion 11 in a state in which the output shaft 31 thrust directions are parallel to an X-Y plane that is orthogonal to the Z direction, and the output shafts 31 are inclined at a specific angle with respect to the cam faces 51, 52.

As illustrated in FIGS. 8, each output portion 30 is configured by: the output shaft 31 positioned at a uniform distance from the selector 50; an output side bevel gear 35 on a leading end side (selector 50 side) of the output shaft 31 that is capable of rotating together as a unit with the output shaft 31, that is capable of projecting forwards or retreating along the output shaft 31 thrust direction with respect to the selector 50, and that is mounted coaxially to the output shaft 31; and a coil spring 39 (biasing member) that biases the output side bevel gear 35 to project forward in the direction of the selector 50. In the first exemplary embodiment, the three output side bevel gears 35 are individually provided corresponding to the three respective input side bevel gears 22. The coil springs 39 bias each of the output side bevel gears 35 in a direction to enmesh with the corresponding input side bevel gear 22.

The output shafts 31 are formed with a circular cylinder portion 33 at a leading end side of a large diameter portion 32. A flange 32A is formed at a rear end of the large diameter portion 32. As illustrated in FIG. 7, in the output shaft 31 of the third output portion 30C, the large diameter portion 32 is supported rotatably and in a thrust direction immovable state inside a circular cylinder shaped shaft bearing holder portion 11c formed in the clutch unit case portion 11 through a shaft bearing bush 34 (see FIG. 4). In the output shaft 31 of the second output portion 30B, the large diameter portion 32 is supported through the shaft bearing bush 34 in a rotatable and thrust direction immovable state due to being interposed between semicircular cylinder shaped shaft bearing holder portions respectively formed to the clutch unit case portion 11 and the cover 13 that configure a circular cylinder shape in a mounted state of the cover 13 to the device case 10. FIG. 7 illustrates a semicircular cylinder shaped shaft bearing holder portion 11b formed at a clutch unit case portion 11 side. The output shaft 31 of the first output portion 30A is rotatably supported inside a worm support portion 120, described later, formed at the clutch unit case portion 11.

Figure 8A:
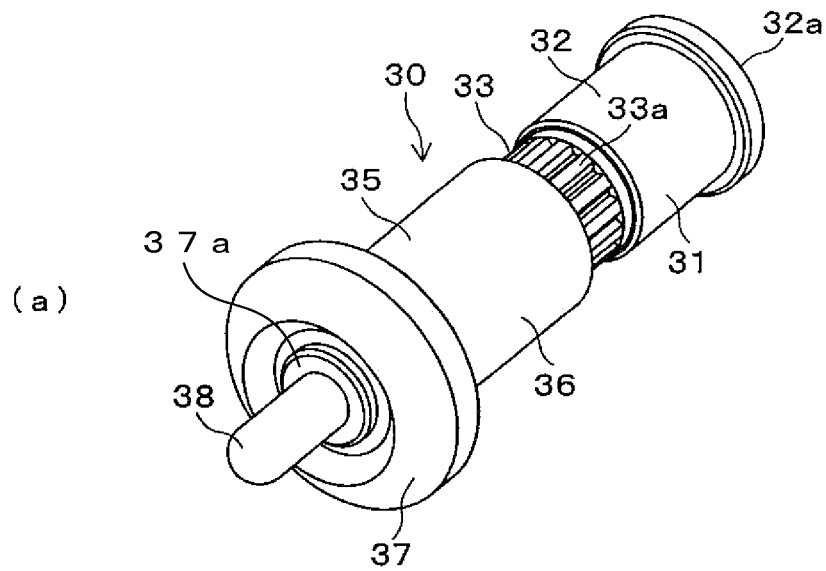
FIG. 8A is a perspective view.
Figure 8B:
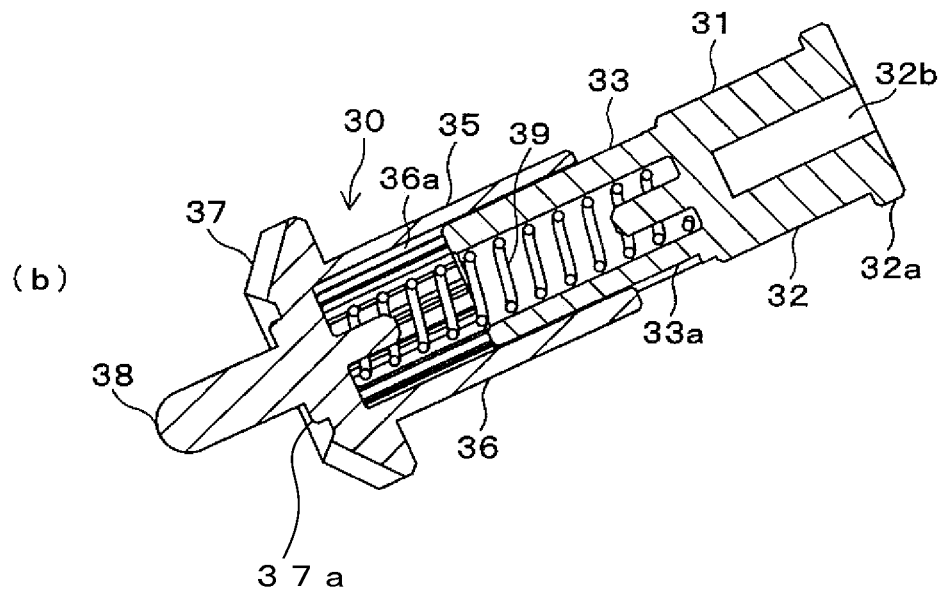
FIG. 8B is a cross-section, respectively illustrating an output portion of the multi-shaft drive device.

As illustrated in FIGS. 8A and 8B, the output side bevel gear 35 is configured by: a circular cylinder shaped slide shaft 36 that is externally mounted to an outer peripheral face of the circular cylinder portion 33 of the output shaft 31 such that relative rotation therebetween is not possible, namely such that the slide shaft 36 can rotate together as a unit with the circular cylinder portion 33, that is coaxially spline joined to the circular cylinder portion 33 so as to be capable of sliding in the thrust direction, and that is also capable of projecting forwards or retreating with respect to the selector 50 along the output shaft 31 thrust direction; a gear portion 37 that is integrally formed to a leading end side of the slide shaft 36 and that enmeshes with the input side bevel gear 22 of the input portion 20 when projecting forwards, and a pin 38 (contact portion) that projects out from the center of the gear portion 37. An outer peripheral side spline portion 33a and an inner peripheral side spline portion 36a that mutually engage with each other are respectively formed to the outer peripheral face of the circular cylinder portion 33 of the output shaft 31 and the inner peripheral face of the slide shaft 36 of the output side bevel gear 35.

In the present exemplary embodiment, the output side bevel gear 35 and the input side bevel gear 22 configure the clutch mechanism 40 according to the present invention.

The coil spring 39 is housed in a compressed state inside the circular cylinder portion 33 of the output shaft 31 and the slide shaft 36 of the output side bevel gear 35. The output side bevel gear 35 is biased in the selector 50 direction by the coil spring 39, and a leading end of the pin 38 abuts the cam faces 51, 52. The leading end face of the pin 38 is formed with a spherical face shape and makes sliding contact with the abutting cam faces 51, 52 when the selector 50 is moved in the Y direction.

As illustrated in FIG. 7, the first cam face 51 of the selector 50 is formed with recessed portions 53 (a first recessed portion 53A and a second recessed portion 53B) corresponding to the first output portion 30A and the second output portion 30B. The second cam face 52 is formed with a recessed portion 53 (a third recessed portion 53C) corresponding to the third output portion 30C. In the present example, the third recessed portion 53 refers to an inclined face continuing to a Y direction end portion of the selector 50. Configuration is made such that when the selector 50 is moved in the Y direction, the pin 38 of any one of the output portions 30 fits into the corresponding recessed portion 53.

Figure 9:
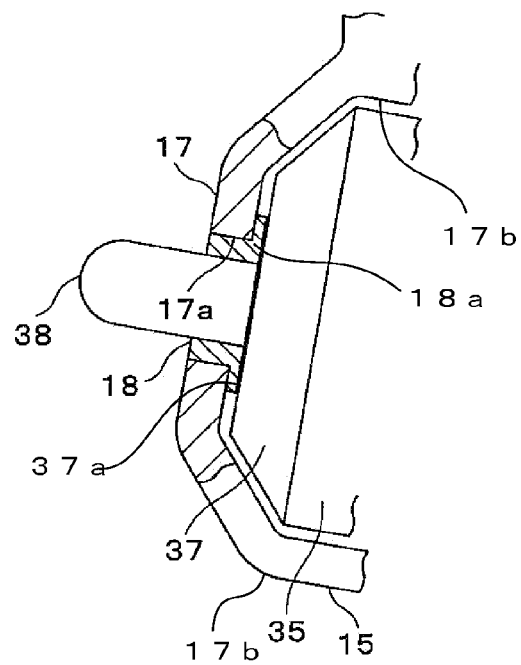
FIG. 9 is a partial cross-section plan view illustrating a support structure for a pin of an output side bevel gear of the multi-shaft drive device.

The overall output side bevel gear 35 slides in the direction of the selector 50 due to the pin 38 fitting into the recessed portion 53. When this occurs, the output side bevel gear 35 engages and enmeshes with the input side bevel gear 22, achieving a connected state of the clutch mechanism 40. As illustrated in FIG. 7 and FIG. 9, in each of the output portions 30, the pin 38 of the output side bevel gear 35 penetrates a through hole 17a in a wall portion 17 formed at the gear holder 15. The output side bevel gears 35 are therefore indirectly supported by the device case 10 through the gear holder 15. The wall portions 17 are formed with cross-section profiles opening towards an output side bevel gear 35 side as viewed along an axial direction of the input side bevel gear 22, and are each integrally provided with a pair of reinforcement portions 17b formed on both radial direction sides of the output side bevel gears 35 (see FIG. 4 and FIG. 9). Shaft bearing bushes 18 are pushed into and fixed to the through holes 17a, and the pins 38 are supported inside the shaft bearing bushes 18 so as to be capable of sliding rotation and thrust direction movement. The shaft bearing bushes 18 configure stoppers together with the wall portions 17.

In connected state of the clutch mechanism 40, namely in the enmeshed state of the output side bevel gear 35 and the input side bevel gear 22, a leading end face 37a (see FIG. 8A) of the gear portion 37 of the output side bevel gear 35 contacts (face-to-face contact in this example) a flange portion 18a of the shaft bearing bush 18, thereby restricting the stroke end (stroke end in the bias direction of the coil spring 39) when the output side bevel gear 35 is projecting forwards. Moreover, in the clutch mechanism 40 connected state, the leading end face 37a of the output side bevel gear 35 contacts the flange portion 18a of the shaft bearing bush 18 (see FIG. 9), thereby performing setting such that the output side bevel gear 35 is positioned in the axial direction at an appropriate position for enmeshing with the input side bevel gear 22. Moreover, in the clutch mechanism 40 connected state, configuration is made such that the pin 38 of the output side bevel gear 35 is separated from the selector 50 (see the first output portion 30A in FIG. 7).

When the motor 1 is actuated and the input portion 20 rotates with the clutch mechanism 40 connected, the rotation is transmitted from the input side bevel gear 22 to the output side bevel gear 35, rotating the output side bevel gear 35. The rotation of the slide shaft 36 is transmitted to the output shaft 31, rotating the output shaft 31. In a state in which the pin 38 is abutting the cam face 51 (52) and not fitted into the recessed portion 53, the output side bevel gear 35 is pushed towards the output shaft 31 side against the coil spring 39 by the cam face 51 (52), resulting in a disconnected state of the clutch mechanism 40 in which the gear portion 37 is separated from the input side bevel gear 22. In the clutch mechanism 40 disconnected state, the leading end face 37a of the output side bevel gear 35 is separated from the flange portion 18a of the shaft bearing bush 18.

The output shafts 31 of each of the output portions 30 are connected to the drive shafts of each of the movable mechanisms described above through the power transmission units. In the present exemplary embodiment, flexible torque cables 5 (see FIG. 2) serving as the power transmission units are connected to the output shafts 31 of the second output portion 30B and the third output portion 30C. The torque cable 5 on the second output portion 30B side is connected to the drive shaft of the reclining mechanism mentioned above, and the torque cable 5 on the third output portion 30C side is connected to the drive shaft of the slide mechanism mentioned above. The torque cables 5 are inserted into mounting holes 32b (see FIG. 8B) formed in rear end faces of the output shafts 31 of the second output portion 30B and the third output portion 30C so as to be capable of rotating together as a unit with the output shafts 31. When the output shafts 31 rotate in the clutch mechanism 40 connected state, the torque cables 5 rotate, respectively actuating the reclining mechanism and the slide mechanism.

As illustrated in FIG. 4, a worm gear 70 and a gear 77 serving as the power transmission member are connected to the output shaft 31 of the first output portion 30A. The worm gear 70 and the gear 77 configure the gearbox 3 mentioned above.

Figure 10:
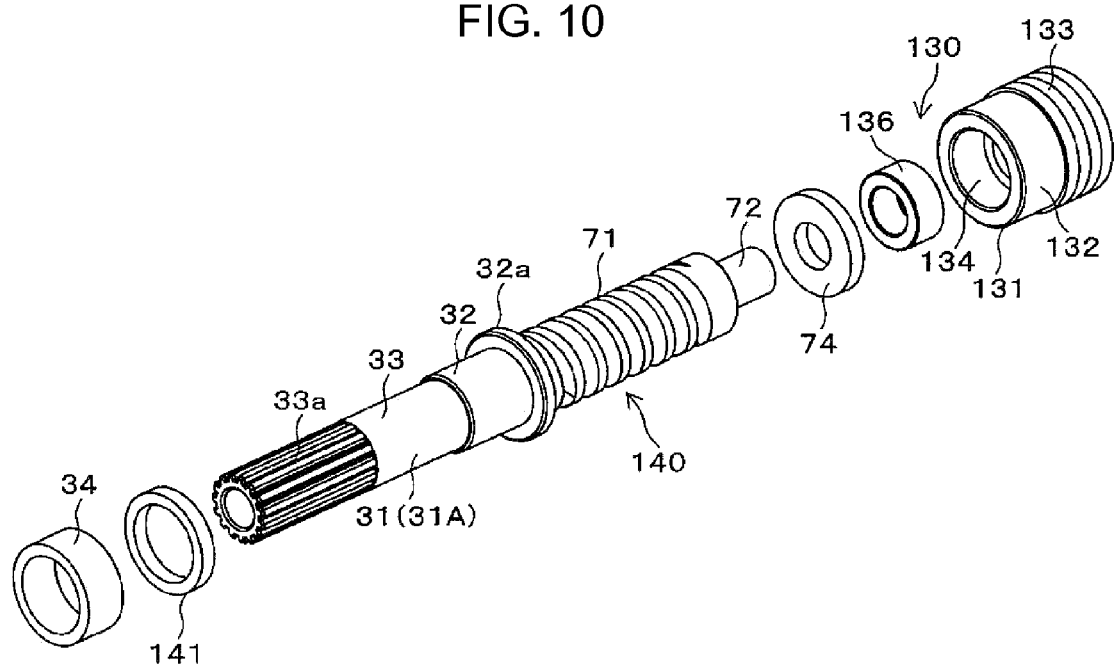
FIG. 10 is an exploded view illustrating members including a transmission shaft with a worm directly integrally formed to an output shaft, and a shaft bearing portion.
Figure 11:
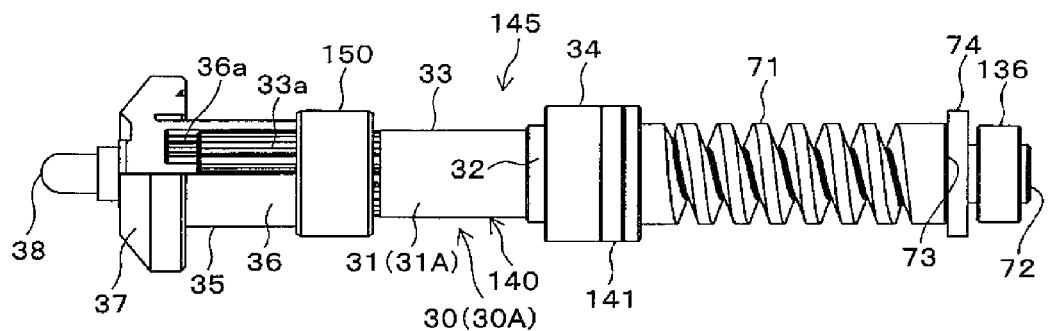
FIG. 11 is a side view illustrating a mounted state of an output side bevel gear to the transmission shaft.

As illustrated in FIG. 10 and FIG. 11, the worm gear 70 is configured including a worm 71 (power transmission units) formed coaxially and integrally to the rear end of the output shaft 31 (referred to below as the output shaft 31A) of the first output portion 30A, and a worm wheel 75 that enmeshes with the worm 71. Namely as illustrated in FIG. 10, the output shaft 31A and the worm 71 of the first output portion 30A are formed on a single circular column shaped transmission shaft 140. A flange 32a is formed at an intermediate portion of the transmission shaft 140. The output shaft 31, including the circular cylinder portion 33 formed with the large diameter portion 32 and the outer peripheral side spline portion 33a that is formed to the outer peripheral face, is formed on one end side of the flange 32a, and the worm 71 is formed on the other end side of the flange 32a.

Figure 12:
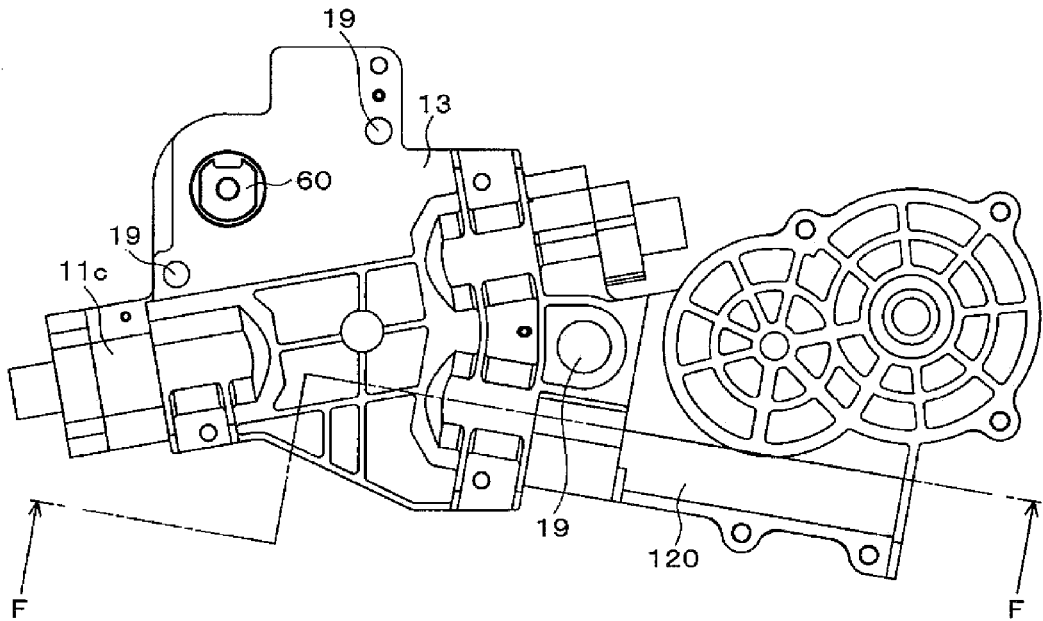
FIG. 12 is an overall plan view illustrating the multi-shaft drive device.
Figure 13:
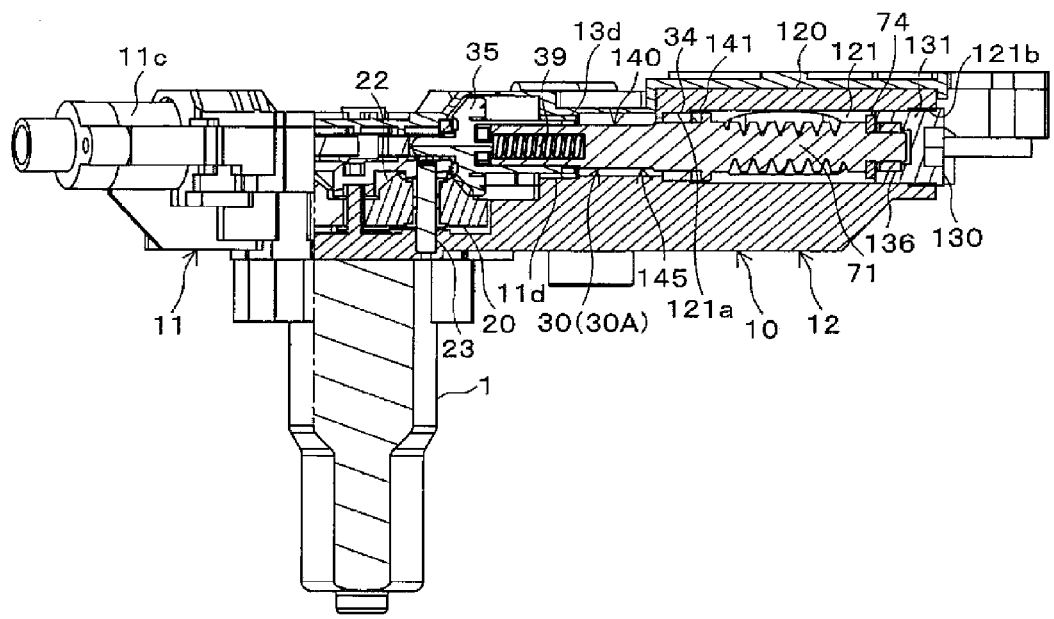
FIG. 13 is a cross-section taken along F-F in FIG. 12.

As illustrated in FIG. 12 and FIG. 13, the worm 71 is inserted into and rotatably supported in the circular cylinder shaped worm support portion 120 formed to the gearbox case portion 12.

Figure 14:
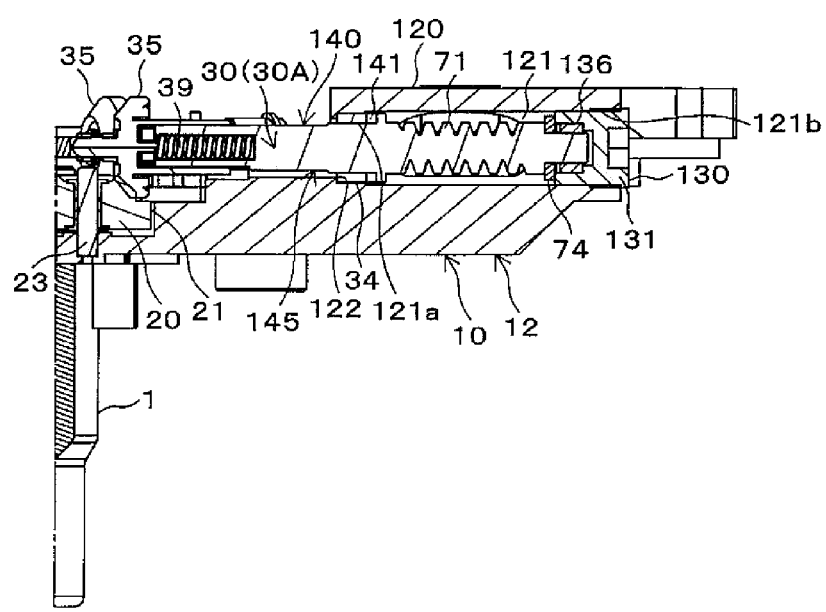
FIG. 14 is a cross-section taken along G-G in FIG. 6.

As illustrated in FIG. 14, a worm insertion hole 121 with a circular cylinder shaped inner peripheral face is formed inside the worm support portion 120. The worm insertion hole 121 is open at both ends. The circular cylinder shaped shaft bearing bush 34 is fitted into an opening portion 121a on one end side of the worm insertion hole 121 (the left hand side in FIG. 14: the clutch unit 2 side) so as to be coaxial to the worm insertion hole 121. The shaft bearing bush 34 contacts a ring shaped stopper step portion 122 formed on the one end side opening portion 121a, preventing the shaft bearing bush 34 from being pulled out of the opening portion 121a. The large diameter portion 32 of the output shaft 31A is supported inside the shaft bearing bush 34 so as to be capable of sliding rotation. A washer 141 is mounted interposed between the shaft bearing bush 34 and the flange 32a. The flange 32a engages with the stopper step portion 122 through the washer 141 and the shaft bearing bush 34, thereby restricting the overall transmission shaft 140 from moving towards the clutch unit 2 side.

A circular column shaped small diameter portion 72 of uniform diameter is formed coaxially to the worm 71 at a worm 71 side end portion of the transmission shaft 140 with a step portion 73 interposed therebetween. The small radius portion 72 is rotatably supported by a shaft bearing portion 130 that is mounted to an opening portion (referred to below as the insertion side opening portion) 121b on the other end side of the worm support portion 120.

Figure 15:
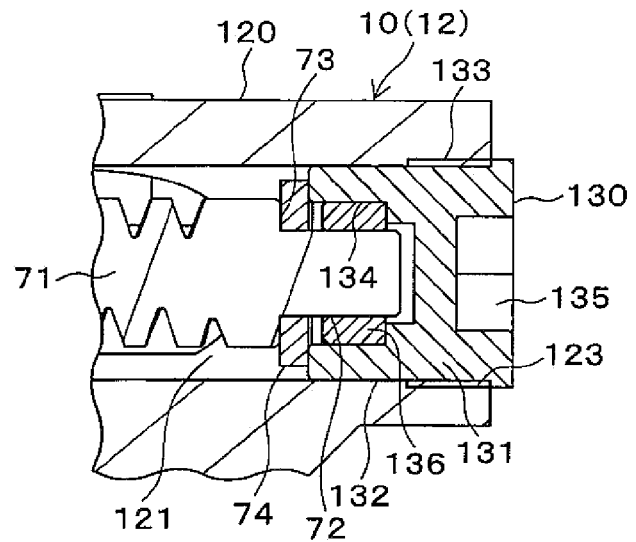
FIG. 15 is a cross-section illustrating a supported state of an end portion of a worm at a shaft bearing portion.

The inner diameter of the worm insertion hole 121 is set with a dimension that forms a uniform gap between the inner diameter of the worm insertion hole 121 and the worm 71. As illustrated in FIG. 15, the shaft bearing portion 130 is configured by a circular cylinder shaped cap 131 and a circular cylinder shaped shaft bearing bush 136 that is fixed to a one end side inner peripheral portion of the cap 131. On the one end side, an outer peripheral face of the cap 131 is formed into a smooth circular cylinder face 132 that can be inserted into the inner peripheral face of the worm support portion 120 so as to be capable of sliding movement therewith. On the other end side of the cap 131, a male thread portion 133 of larger diameter than the circular cylinder face 132 is formed coaxially to the circular cylinder face. A circular cylinder face 132 side end face of the cap 131 is formed with a shaft bearing hole 134 that is coaxial to the circular cylinder face 132. The shaft bearing bush 136 is pushed into and fixed to the shaft bearing hole 134. The pushed in state of the shaft bearing bush 136 is completely inside the shaft bearing hole 134. A male thread portion 133 side end face of the cap 131 is formed with a hexagonal hole 135. An insertion side opening portion 121b side end portion of the worm support portion 120 is formed with a female thread portion 123 into which the male thread portion 133 is screwed. The shaft bearing bush 34, the circular cylinder face 132 and the male thread portion 133 that configure the outer peripheral face of the cap 131, the shaft bearing hole 134 of the cap 131, and the shaft bearing bush 136 are all coaxial to the worm insertion hole 120a.

The shaft bearing portion 130 is mounted to the insertion side opening portion 121b of the worm support portion 120 by sliding the circular cylinder face 132 of the cap 131 into the insertion side opening portion 121b of the worm support portion 120 and screwing the male thread portion 133 into the female thread portion 123. The small radius portion 72 of the worm 71 is inserted into and supported inside the shaft bearing bush 136 so as to be capable of sliding rotation. Note that in the present exemplary embodiment, a washer 74 is inserted over the small radius portion 72, and the step portion 73 of the worm 71 engages with the cap 131 through the washer 74, thereby restricting the overall transmission shaft 140 from moving towards the direction opposite to the clutch unit 2. An intermediate portion of the worm support portion 120 is formed with a notch 124 that exposes a portion of the worm 71 so as to be capable of engaging with the worm wheel 75.

The transmission shaft 140 is set in the worm support portion 120 in the following manner. Firstly, the shaft bearing bush 34 and the washer 141 are mounted to the large diameter portion 32 of the output shaft 31A, and the coil spring 39 is loaded inside the circular cylinder portion 33 of the output shaft 31A. Then the transmission shaft 140 is inserted into the worm insertion hole 121 from the output shaft 31 side. The pin 38 is then inserted into the shaft bearing bush 18 that is fixed to the through hole 17a of the wall portion 17 of the gear holder 15, and the outer peripheral side spline portion 33a of the output shaft 31A is fitted into the inner peripheral side spline portion 36a of the output side bevel gear 35 that is housed in the housing portion 14. Next, after fitting the washer 74 onto the small radius portion 72, the circular cylinder face 132 of the cap 131 is inserted into the insertion side opening portion 121b, and the small radius portion 72 is inserted into the shaft bearing bush 136 whilst screwing the male thread portion 133 into the female thread portion 123.

The transmission shaft 140 that is rotatably supported by the worm support portion 120, and the output side bevel gear 35 that is mounted on the output shaft 31A of the transmission shaft 140, are thereby coupled together, configuring a compound gear 145 in which the output side bevel gear 35 is on a leading end side, the worm 71 is on a rear end side, and the output side bevel gear 35 is spline joined to the worm 71.

In the transmission shaft 140 of the compound gear 145, the small radius portion 72 at the rear end portion of the worm 71 is supported by the shaft bearing bush 136 of the shaft bearing portion 130, and the large diameter portion 32 of the output shaft 31A at the intermediate portion is supported by the shaft bearing bush 34 disposed in the one end side opening portion 121a of the worm support portion 120, such that the transmission shaft 140 is rotatable whilst being positioned in a radial direction. The amount by which the cap 131 is screwed into the female thread portion 123 can be adjusted by rotating the cap 131, enabling adjustment of the thrust direction position of the worm 71.

In the output side bevel gear 35 of the compound gear 145, the leading end pin 38 is supported by the shaft bearing bush 18 of the wall portion 17 of the gear holder 15, and a rear end portion of the slide shaft 36 is rotatably supported through a shaft bearing bush 150 illustrated in FIG. 11.

Figure 16:
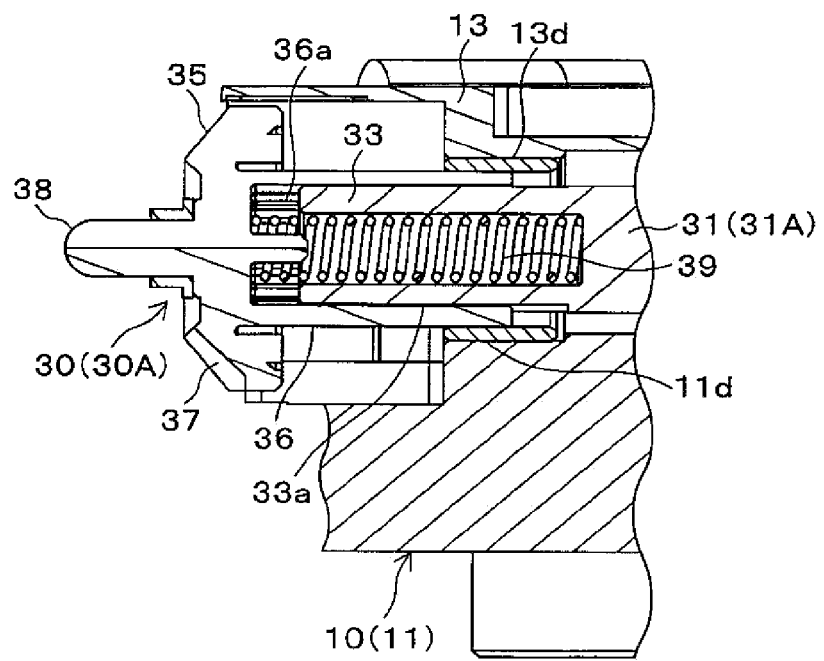
FIG. 16 is a cross-section illustrating a support structure of an output side bevel gear of a first output portion.

The shaft bearing bush 150 is retained interposed between a semicircular cylinder shaped shaft holder portion 11d formed at the clutch unit case portion 11 of the device case 10 and a shaft holder portion 13d formed at the cover 13, as illustrated in FIG. 16. In the output side bevel gear 35, the leading end pin 38 and the rear end portion of the slide shaft 36 are accordingly respectively supported by the shaft bearing bush 18 and the shaft bearing bush 150 so as to be capable of sliding rotation. The output side bevel gear 35R can accordingly be positioned with respect to the radial direction thereof in a state of being supported at both ends thereof.

Namely, in the compound gear 145 in which the transmission shaft 140 with the integrated output shaft 31A and the worm 71 is spline joined to the output side bevel gear 35, the leading end pin 38 of the output side bevel gear 35, the rear end portion of the worm 71, the large diameter portion 32 at the rear end portion of the output shaft 31A, and the slide shaft 36 of the output side bevel gear 35 are each respectively supported in a state capable of sliding rotation by the shaft bearing bush 18, the shaft bearing bush 136, the shaft bearing bush 34, and the shaft bearing bush 150.

In the present exemplary embodiment, in this supported state the clearance between the outer peripheral side spline portion 33a of the output shaft 31A and the inner peripheral side spline portion 36a of the slide shaft 36 of the output side bevel gear 35 is set such that shaft misalignment between the transmission shaft 140 and the output side bevel gear 35 can be absorbed. In other words, the clearance between the respective spline portions 33a, 36a is set comparatively loosely such that the outer peripheral side spline portion 33a of the output shaft 31A can be fitted into the inner peripheral side spline portion 36a of the output side bevel gear 35 even when the output side bevel gear 35 that is supported by the shaft bearing bushes 18, 150 is not strictly coaxial to the transmission shaft 140 supported by the shaft bearing bushes 34, 136 due to low mutual coaxiality between the shaft bearing bushes 18, 150, 34, 136.

As illustrated in FIG. 4, the gearbox 3 is configured by the worm gear 70 that includes the worm 71 and the worm wheel 75 that engages with the worm 71, and the gear 77. The worm wheel 75 is rotatably supported by the gearbox case portion 12. A small diameter gear 76 is formed at the center of the worm wheel 75. The small diameter gear 76 engages with the gear 77. The gear 77 is fixed to a drive shaft 160 of the lifter mechanism mentioned above that is orthogonal to the transmission shaft 140. When the output shaft 31A of the first output portion 30A rotates in the clutch mechanism 40 connected state, the gearbox 3 is actuated, whereby the worm 71 is rotated. This rotation is transmitted to the worm wheel 75, and the rotation of the worm wheel 75 is transmitted from the small diameter gear 76 to the gear 77. The drive shaft 160 of the lifter mechanism is thereby rotated, actuating the lifter mechanism.

In the multi-shaft drive device of the first exemplary embodiment described above, the multi-shaft drive device is fixed to a member such as a seat frame using plural screw insertion holes 19 provided to peripheral edges of the device case 10 and the cover 13.

(2) Multi-shaft Drive Device Operation

The multi-shaft drive device described above operates as follows.

FIG. 7 illustrates a state in which the pin 38 of the output side bevel gear 35 of the first output portion 30A has been fitted into the first recessed portion 53A by rotating the operation shaft 60 to move the selector 50 in the Y direction. In this state, the output side bevel gear 35 of the first output portion 30A engages with the input side bevel gear 22 corresponding to the first output portion 30A, resulting in a connected state of the clutch mechanism 40. In the other output portions 30 (the second output portion 30B and the third output portion 30C), the pins 38 are pressed by the cam faces 51, 52 and the output side bevel gears 35 are separated from the corresponding input side bevel gears 22, such that the respective clutch mechanisms 40 are in a disconnected state.

From this state, when the selector 50 is moved a specific distance in the Y1 direction, the pin 38 of the second output portion 30B fits into the second recessed portion 53B, and the output side bevel gear 35 of the second output portion 30B enmeshes with the corresponding input side bevel gear 22, resulting in a connected state of the clutch mechanism 40. When this occurs, in the other output portions 30 (the first output portion 30A and the third output portion 30C), the pins 38 are pressed by the cam faces 51, 52, and the output side bevel gears 35 separate from the corresponding input side bevel gears 22, such that the respective clutch mechanisms 40 are in a disconnected state.

When the selector 50 is again moved a specific distance in the Y1 direction, the pin 38 of the third output portion 30C projects forward into the third recessed portion 53C, and the output side bevel gear 35 of the third output portion 30C enmeshes with the corresponding input side bevel gear 22, resulting in a clutch mechanism 40 connected state. When this occurs, in the other output portions 30 (the first output portion 30A and the second output portion 30B), the pins 38 are pressed by the cam face 51, and the output side bevel gears 35 separate from the corresponding input side bevel gears 22, such that the respective clutch mechanisms 40 are in a disconnected state.

The selector 50 is moved back and forth in the Y direction by forward and reverse rotation of the operation shaft 60. Along the path of this movement, the pins 38 project forwards into any one of the recessed portions 53A to 53C of the selector 50, such that when this occurs, one of the output portions 30 out of the first to third output portions 30A to 30C is selected as described above. The output side bevel gear 35 of the selected output portion 30 enmeshes with the corresponding input side bevel gear 22 to achieve the clutch mechanism 40 connected state.

In this connected state of the clutch mechanism 40, when the switch is switched ON and the motor 1 is actuated, the power of the motor 1 is transmitted from the input side bevel gear 22 to the output side bevel gear 35, rotating the output shaft 31. In the second output portion 30B and the third output portion 30C, the rotation of the output shaft 31 is transmitted to the drive shafts of the reclining mechanism and the slide mechanism through the torque cables 5, actuating the reclining mechanism and the slide mechanism. In the first output portion 30A, the rotation of the output shaft 31A is transmitted to rotate the drive shaft 160 of the lifter mechanism through the gearbox 3, namely through the worm 71, the worm wheel 75, the small diameter gear 76 and the gear 77, actuating the lifter mechanism. The rotation direction of the output shafts 31 and the drive shafts of the movable mechanisms can be switched by switching the rotation direction of the motor 1 using the switch.

(3) Advantageous Effects of the First Exemplary Embodiment

In the first exemplary embodiment described above, the plural output side bevel gears 35 are biased in the enmeshing direction with the corresponding input side bevel gears 22. The output side bevel gears 35 that enmesh with the input side bevel gears 22 contact the shaft bearing bushes 18 attached to the wall portions 17. The bias direction stroke ends of the output side bevel gears are accordingly restricted. Moreover, the wall portions 17 are provided at the gear holder 15 that is fixed to the device case 10 that supports the input side bevel gears 22. The axial direction positions of the output side bevel gears 35 can accordingly always be positioned at uniform positions to enmesh appropriately with the input side bevel gears 22. An appropriate backlash can accordingly be obtained in the enmeshed state of the output side bevel gears 35 with the input side bevel gears 22. As a result, tooth end bearing of the gears can be suppressed, increasing durability, and enabling operating noise occurring during enmeshing to be reduced.

Moreover, in the enmeshed state of the output side bevel gears 35 with the corresponding input side bevel gears 22, namely a contact state between the output side bevel gears 35 and the shaft bearing bushes 18, the output side bevel gears 35 are separated from the selector 50. Accordingly, during rotation of the output side bevel gears 35, the output side bevel gears 35 can be prevented from making sliding contact with the selector 50, thereby enabling wear of the output side bevel gears 35 and the selector 50 accompanying such sliding contact to be prevented. The durability of the output side bevel gears 35 and the selector 50 can accordingly be increased.

In the enmeshed state of the output side bevel gears 35 with the corresponding input side bevel gears 22, the output side bevel gears 35 make face-to-face contact with the flange portions 18a of the shaft bearing bushes 18. During rotation of the output side bevel gears 35, a pressure arising at contact portions of surfaces of the output side bevel gears 35 and the shaft bearing bushes 18 can be managed to an appropriate permissible value or below. Wear of the output side bevel gears 35 and the shaft bearing bushes 18 can accordingly be suppressed. Since localized wear or uneven wear of the output side bevel gears 35 and the shaft bearing bushes 18 can be prevented, the durability of the output side bevel gears 35 and the shaft bearing bushes 18 can be increased.

Moreover, in the present exemplary embodiment, the wall portions 17 provided at the gear holder 15 support the pins 38 of the output side bevel gears 35 so as to be capable of both rotation and movement in the thrust direction, and define the bias direction stroke ends of the output side bevel gears 35. Namely, the wall portions 17 (stoppers) that restrict the stroke ends of the output side bevel gears 35 are also provided with a function of providing shaft support to the output side bevel gears 35, enabling configuration to be simplified in comparison to when stoppers and shaft support portions are provided separately to each other.

Moreover in the present exemplary embodiment, the leading ends of the pins 38 of the output side bevel gears 35 penetrate the through holes 17a of the wall portions 17 provided to the gear holder 15 and make sliding contact with the selector 50, thereby projecting forwards or retreating the output side bevel gears 35 with respect to the input side bevel gears 22. Namely, the pins 38 are pressed towards the opposite side to the input side bevel gears 22 by the selector 50, separating the output side bevel gears 35 from the input side bevel gears 22. On release of this pressing of the pins 38, the output side bevel gears 35 enmesh with the input side bevel gears 22 due to the biasing force of the coil springs 39. The configuration of the selector 50 can accordingly be simplified, as the selector 50 is configured so as to simply press or release pressing of the pins 38.

In the present exemplary embodiment, the wall portions 17 that provide shaft support to the output side bevel gears 35 and restrict the bias direction stroke ends of the output side bevel gears 35 are formed to the gear holder 15 that is fixed to the device case 10. The configuration of the device case 10 can accordingly be simplified. During manufacture of the multi-shaft drive device, the gear holder 15 (wall portions 17) and the output side bevel gears 35 can be assembled to the device case 10 separately to each other, enabling assembly operations to be more flexible.

Moreover, in the present exemplary embodiment, the wall portion 17 formed to the gear holder 15 includes the pairs of reinforcement portions 17b that are formed to face both radial direction sides of the output side bevel gears 35. The reinforcement portions 17b can accordingly suppress deformation of the wall portions 17 when the wall portions 17 are being pressed by the output side bevel gears 35 that are biased towards the enmeshing direction with the input side bevel gears 22. Due to contacting the wall portions 17, positions of the output side bevel gears 35 in the axial direction can accordingly be designated at uniform positions with high precision. The backlash in the enmeshed state between the output side bevel gears 35 and the input side bevel gears 22 can accordingly be stabilized with a high degree of precision.

Supplementary Explanation of the First Exemplary Embodiment

In the first exemplary embodiment described above, the wall portions 17 are formed with open cross-section profile, however the present invention is not limited thereto, and the configuration of the wall portion may be modified as appropriate. There is no limitation of the stopper according to claim 1 to a wall shape, and the shape thereof may be modified as appropriate.

In the first exemplary embodiment described above, it is the leading ends of the pins 38 of the output side bevel gears 35 that make sliding contact with the selector 50, however the present invention is not limited thereto, and portions of the output side bevel gears that make sliding contact with the selector may be varied as appropriate.

Moreover, in the first exemplary embodiment described above, configuration is made wherein the wall portions 17 (stoppers) that restrict the biasing direction stroke ends of the output side bevel gears 35 also provide shaft support to the output side bevel gears 35, however the present invention is not limited thereto. Configuration may be made wherein stoppers and shaft support portions are provided separately to each other.

Moreover, in the first exemplary embodiment described above, the output side bevel gears 35 and the shaft bearing bushes 18 of the wall portions 17 make face-to-face contact with each other, however the present invention is not limited thereto and appropriate modifications may be made to the manner in which the output side bevel gears and the stoppers contact each other. However, a configuration that enables the durability of the output side bevel gears and the stoppers to be secured is preferable.

In the first exemplary embodiment described above, configuration is made wherein the output side bevel gears 35 are separated from the selector 50 in the enmeshed state of the output side bevel gears 35 and the input side bevel gears 22 (the clutch connected state), however the present invention is not limited thereto, and configuration may be made wherein the output side bevel gears and the selector are constantly in contact with each other. The above supplementary explanation similarly applies to the second exemplary embodiment of which explanation follows.

In the first exemplary embodiment described above, configuration is made wherein the gear holder 15 that is fixed to the device case 10 serves as a retention member, however the present invention is not limited thereto, and the retention member may be any member that is fixed to the case.

Moreover, in the first exemplary embodiment described above, configuration is made wherein the coil springs 39 serving as biasing members are provided inside the output side bevel gears 35 and the output shafts 31, however the present invention is not limited thereto, and configuration may be made wherein the biasing members are provided to the outside of the output side bevel gears and the output shafts.

Second Exemplary Embodiment

Explanation follows regarding a multi-shaft drive device according to a second exemplary embodiment of the present invention, with reference to FIG. 17 to FIG. 21.

(1) Multi-shaft Drive Device Configuration

Figure 17:
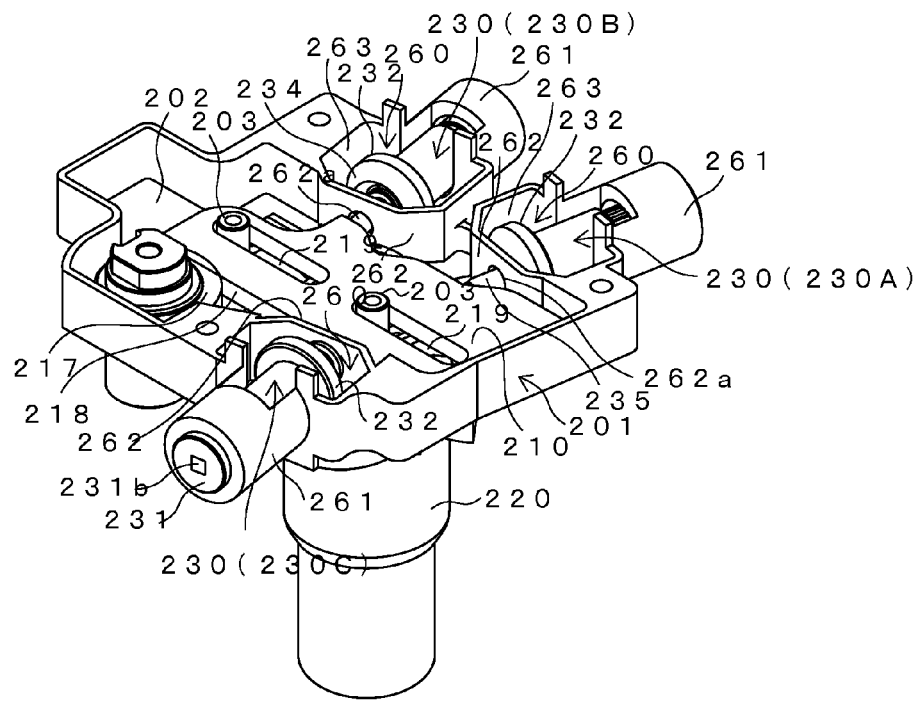
FIG. 17 is a perspective view illustrating a multi-shaft drive device according to a second exemplary embodiment of the present invention.
Figure 18:
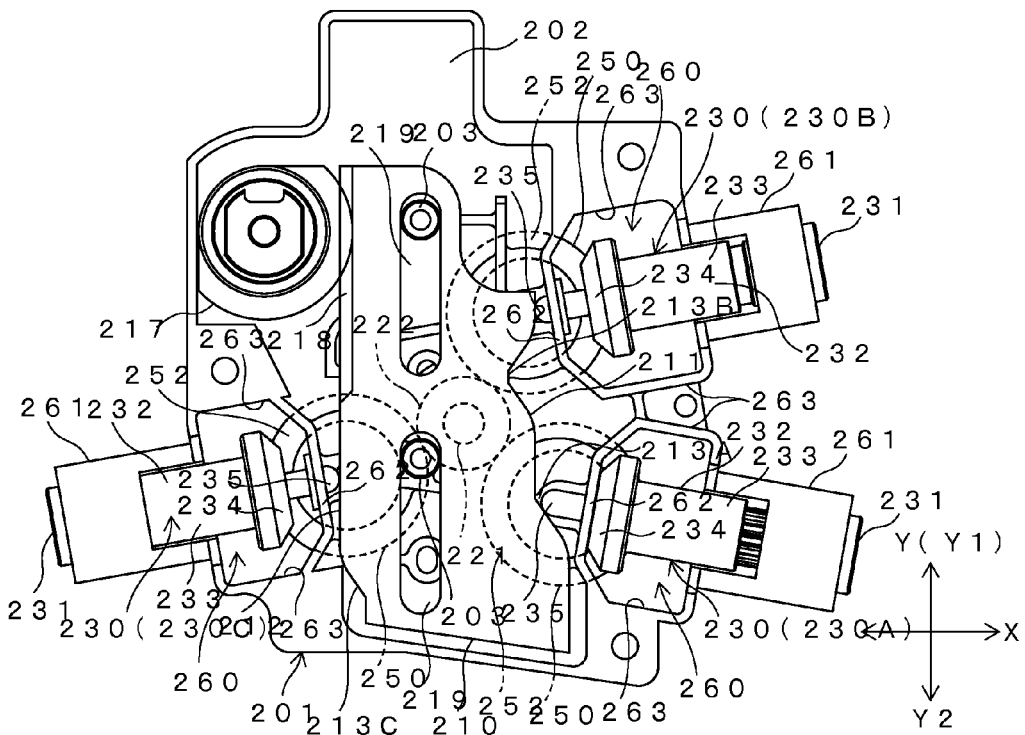
FIG. 18 is a plan view illustrating the multi-shaft drive device.

FIG. 17 and FIG. 18 are respectively a perspective view and a plan view of a multi-shaft drive device according to the second exemplary embodiment. As can be seen in FIG. 17 and FIG. 18, a case 201 includes a recessed area 202 that is open upwards, a selector 210 is housed inside the recessed area 202 of the case 201, and a motor 220 is fixed to a lower portion of the case 201. The opening of the recessed area 202 of the case 201 is covered by a cover, not illustrated in the drawings, that is fixed to the case 201. The selector 210 is a substantially rectangular plate shaped member that is long in the Y direction in FIG. 18, and is formed with 2 guide holes 219 extending in the Y direction at a width direction (X direction) central portion. Guide projections 203 projecting from a bottom portion of the recessed area 202 are respectively inserted into the guide holes 219, with the guide holes 219 being guided by the guide projections 203 such that the selector 210 is supported so as to be capable of sliding in the Y direction.

Out of the two length direction side faces of the selector 210, a first cam face 211 is formed on the side face on the right hand side in FIG. 18. A second cam face 212 is formed on a lower side of the side face on the left hand side, of which an upper side is formed with a rack 218 with a row of teeth running along the Y direction. A pinion 217 that is rotatably supported to the case 201 enmeshes with the rack 218. A dial, not illustrated in the drawings, that is disposed above the cover is fixed to the pinion 217 through a rotation shaft. The pinion 217 rotates when the dial is rotated, and the selector 210 is moved back and forth along the Y direction through the rack 218 according to the rotation direction of the dial.

Figure 19:
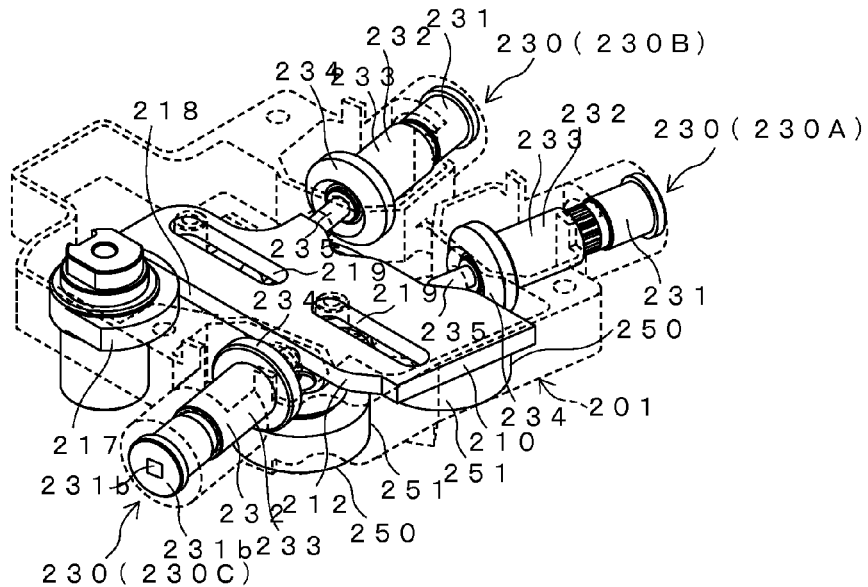
FIG. 19 is a perspective view illustrating movable portions of the multi-shaft drive device.
Figure 20:
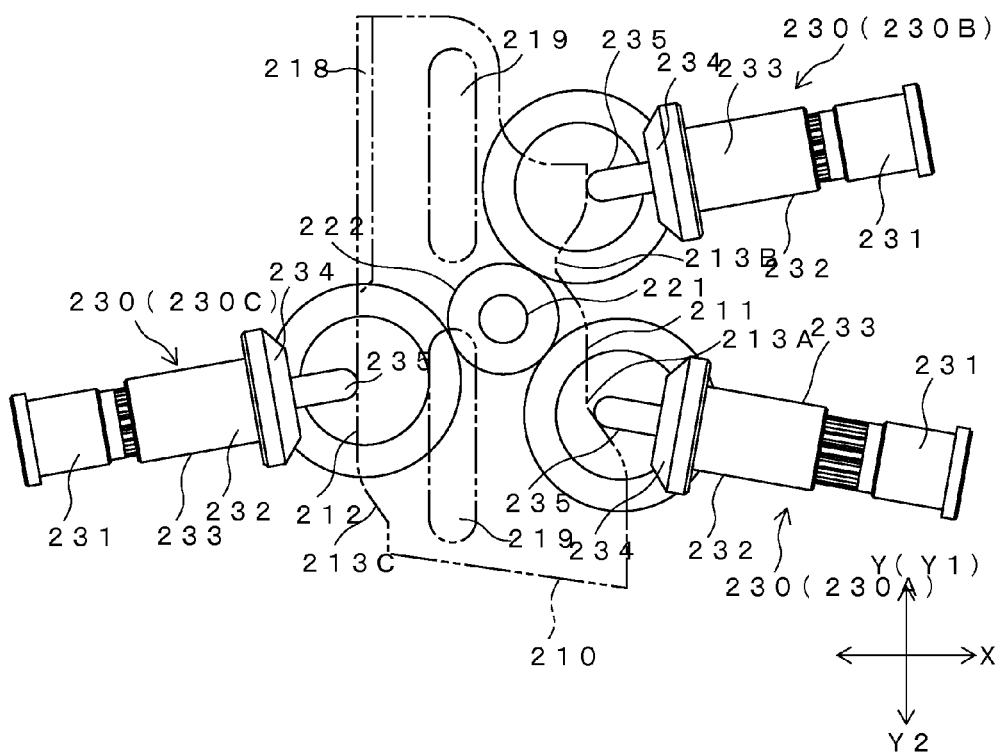
FIG. 20 is a plan view of the movable portions.

As illustrated in FIG. 19 and FIG. 20, output portions 230 are disposed on both X direction sides of the selector 210 facing the respective cam faces 211, 212. In the present example, two of the output portions 230 (a first output portion 230A and a second output portion 230B) are disposed facing the first cam face 211 separated from each other in the Y direction, and one of the output portions 230 (a third output portion 230C) is disposed facing the second cam face 212. The output portions 230 are housed in housing portions 260 formed at the case 201 as illustrated in FIG. 17 and FIG. 18.

As illustrated in FIG. 18 and FIG. 20, a motor shaft 221 of the motor 220 projects upwards. The motor shaft 221 can be rotated forwards and in reverse. A pinion 222 is fixed to the motor shaft 221. Three input side clutch members 250 corresponding to the respective output portions 230 are provided to the periphery of the pinion 222 and are rotatably supported on the case 201. Each of the input side clutch members 250 is of a similar configuration, and includes an input gear 251 that enmeshes with the pinion 222 configured by a flattened cog, and an input side bevel gear 252 integrally formed to an upper face of the input gear 251. The input side clutch members 250 having the input side bevel gears 252 are rotatably supported on the case 201, thereby positioning the input side clutch members 250 at specific positions. The motor 220 is switched ON/OFF, and the rotation direction selected, for example by a switch provided to the dial. When the motor 220 is actuated, all of the input side clutch members 250 rotate.

Figure 21A:
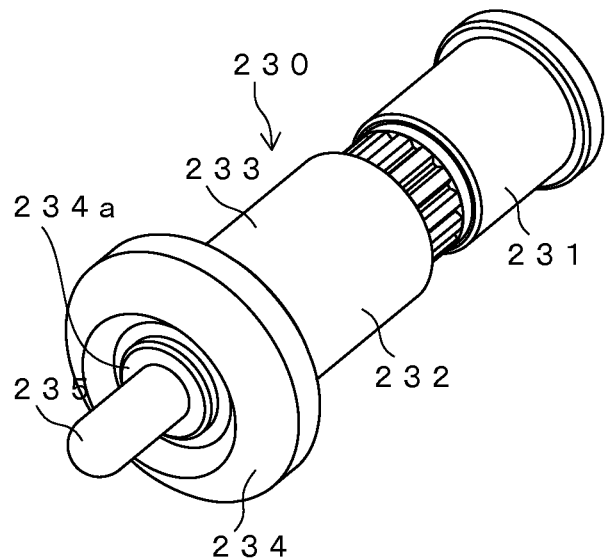
FIG. 21A is a perspective view.
Figure 21B:
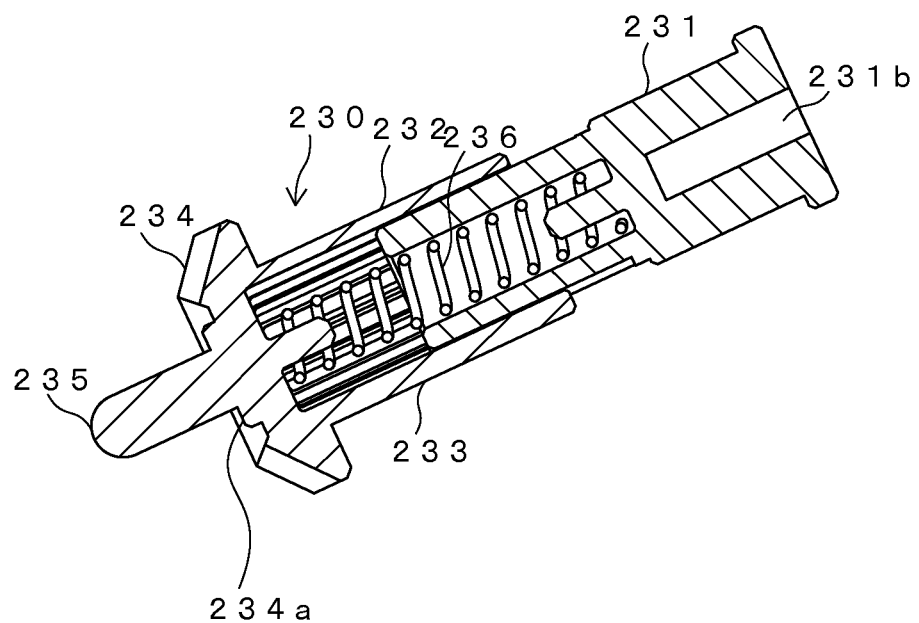
FIG. 21B is a cross-section view, respectively illustrating an output portion of the multi-shaft drive device of the second exemplary embodiment.

Each of the output portions 230 (230A to 230C) are of similar configuration. As illustrated in FIG. 20 and FIG. 21, each of the output portions 230 is configured including an output shaft 231 disposed in a state facing the cam face 211 (212), an output side clutch member 232 provided so as to be capable of rotating together as a unit with the output shaft 231, and also capable of projecting forwards or retreating along the output shaft 231 axial direction with respect to the cam face 211 (212), and a coil spring 236 (biasing member) that biases the output side clutch member 232 so as to project forward toward the input side bevel gear 252.

The output shafts 231 are rotatably supported by support portions 261 configuring the housing portions 260 of the case 201. The output shafts 231 are respectively connected through torque cables, not illustrated in the drawings, to movable mechanisms provided to an electric seat in a vehicle, for example, a mechanism for adjusting the height of a seat face, a reclining mechanism for adjusting the angle of the seatback (backrest portion), and a mechanism for adjusting the front-rear position of the seat. One end portions of the torque cables are inserted into mounting holes 231b (see FIG. 17) of rectangular cross-section profile that are formed to rear end faces of the output shafts 231, and rotate together with the output shafts 231.

As illustrated in FIGS. 21, the output side clutch members 232 are each configured including: a circular cylinder shaped slide shaft 233 that is externally mounted at the selector 210 side of the output shaft 231; an output side bevel gear 234 with a toothed face integrally formed to a leading end side of the slide shaft 233 facing towards the selector 210 side; a pin (contact portion) 235 that projects out in the axial direction from a central portion of the output side bevel gear 234; and a coil spring 236 that biases the slide shaft 233 in the direction of the selector 210.

An inner peripheral face of the slide shaft 233 is not capable of relative rotation in a circumferential direction with respect to an outer peripheral face of the output shaft 231, namely the slide shaft 233 is capable of rotating as a unit together with the output shaft 231, and the two are spline joined together so as to allow sliding along the axial direction. The slide shafts 233 are accordingly capable of projecting forwards or retreating in an axial direction of the output shaft 231 with respect to the cam faces. The coil spring 236 is housed inside the output shaft 231 and the slide shaft 233 in a compressed state, and biases the slide shaft 233 from the output shaft 231 towards the cam faces 211 (212). Leading ends of the pins 235 of the output side clutch members 232 accordingly abut the cam faces 211 (212) when the pins 235 face the cam faces 211 (212). Leading end faces of the pins 235 are formed with spherical face shapes, and make sliding contact with the abutting cam faces 211 (212) when the selector 210 is moved in the Y direction by the dial described above.

The first cam face 211 of the selector 210 is formed with a first recessed portion 213A and a second recessed portion 213B serving as cam portions corresponding to the first output portion 230A and the second output portion 230B, and the second cam face 212 is formed with a third recessed portion 213C serving as a cam portion corresponding to the third output portion 230C. When the selector 210 is operated so as to move along the Y direction as described above, the pin 235 of any one of the output portions 230 faces the corresponding recessed portion 213A (213B, 213C). The output side clutch member 232 is biased as a whole towards the cam face 211 (212) by the coil spring 236, such that the pin 235 projects out and fits into the recessed portion 213A (213B, 213C).

The output side clutch member 232 slides as a whole in the selector 210 direction (the direction for engaging with the input side bevel gear 252) when the pin 235 projects out and fits into the recessed portion 213A (213B, 213C), and the output side bevel gear 234 enmeshes with the input side bevel gear 252, achieving a clutch connected state. When the motor 220 is actuated and the input side clutch member 250 rotates within the clutch connected state, the rotation is transmitted from the input side bevel gear 252 to the enmeshed output side bevel gear 234, and the overall output side clutch member 232 rotates. The rotation of the slide shaft 233 is transmitted to the output shaft 231 and the output shaft 231 rotates, thereby rotating and actuating the torque cable. When the pin 235 is not in a state facing the recessed portion 213A (213B, 213C), the pin 235 contacts the cam face 211 (212) at a portion other than the recessed portion 213A (213B, 213C), the cam face 211 (212) pressing the pin 235 towards the output shaft 231 side against the coil spring 236. When this occurs, the output side bevel gear 234 separates from the input side bevel gear 252 to achieve a clutch disconnected state.

The housing portions 260 of the case 201 in which the output portions 230 are housed are each formed so as to enclose the respective output side clutch member 232 and include: the circular cylinder shaped support portion 261 that is positioned at a rear portion side of the output portion 230 and that rotatably supports the output shaft 231 in a state restricting movement towards the rear and away from the selector 210; a leading end wall portion 262 (wall portion) positioned at the output portion 230 leading end side; and a pair of side wall portions 263 that are integrally formed with the support portion 261 and the leading end wall portion 262 so as to couple together the support portion 261 and the leading end wall portion 262, and formed so as to face both sides of the output side clutch member 232 including the output side bevel gear 234. The support portion 261, the leading end wall portion 262 and the pair of side wall portions 263 are integrally formed to the case 201.

The leading end wall portion 262 is formed with a through hole 262a where the pin 235 rotatably penetrate. The output side bevel gears 234 are thereby directly supported by the case 201. Each of the output portions 230 is inserted inside the corresponding housing portion 260 from an opening upper portion with the coil spring 236 compressed to a contracted state such that the output side clutch member 232 and the output shaft 231 mutually approach each other, with the pin 235 passed through the through hole 262a of the leading end wall portion 262. Next, the compressed force is released, and the output shaft 231 is inserted inside the support portion 261, thereby assembling the output portion 230 inside the housing portion 260.

The output shaft 231 of the output portion 230 that has been thus assembled inside the housing portion 260 is rotatably supported by the support portion 261. The pin 235 penetrates the through hole 262a such that both end portions of the output portion 230 are rotatably supported. When the output side clutch member 232 that is biased in the selector 210 direction by the coil spring 236 is in the clutch connected state wherein the pin 235 is fitted into any one of the recessed portions 213A to 213C of the selector 210 and projecting forwards in the selector 210 direction, a leading end face 234a of the output side bevel gear 234 contacts (makes face-to-face contact with) an inner face of the leading end wall portion 262. Stroke end in the bias direction of the output side bevel gear 234 is accordingly designated, and the output side bevel gear 234 is restricted from projecting forward any further toward the selector 210 side.

In the clutch connected state in which the output side bevel gear 234 is enmeshed with the input side bevel gear 252, setting is made to position the output side bevel gear 234 in the axial direction at an appropriate enmeshing position with the input side bevel gear 252 due to the leading end face 234a of the output side bevel gear 234 contacting the inner face of the leading end wall portion 262. Moreover, in the clutch disconnected state in which the pin 235 is pressed by the cam faces 211, 212 of the selector 210 and the output side bevel gear 234 has separated from the input side bevel gear 252, the leading end face 234a of the output side bevel gear 234 separates from the inner face of the leading end wall portion 262.

(2) Multi-shaft Drive Device Operation

Explanation follows regarding operation of the multi-shaft drive device described above. FIG. 18 and FIG. 20 illustrate a state in which the dial has been rotated, moving the selector 210 in the Y direction, and the pin 235 of the output side clutch member 232 of the first output portion 230A is projecting out and fitting into the first recessed portion 213A. Here, the output side bevel gear 234 of the first output portion 230A is enmeshed with the input side bevel gear 252 corresponding to the first output portion 230A, achieving the clutch connected state. In the other output portions 230 (the second output portion 230B and the third output portion 230C), the pins 235 are pressed by the cam faces 211, 212 and the output side bevel gears 234 are separated from the corresponding input side bevel gears 252.

When the selector 210 is moved from this state a specific distance in the Y1 direction, the pin 235 of the second output portion 230B projects out and fits into the second recessed portion 213B, and the output side bevel gear 234 of the second output portion 230B enmeshes with the corresponding input side bevel gear 252, to achieve a clutch connected state. When this occurs, in the other output portions 230 (the first output portion 230A and the third output portion 230C), the pins 235 are pressed by the cam faces 211, 212, and the output side bevel gears 234 separate from the corresponding input side bevel gears 252 to achieve a clutch disconnected state.

When the selector 210 is again moved a specific distance in the Y1 direction, the pin 235 of the third output portion 230C projects out and fits into the third recessed portion 213C, and the output side bevel gear 234 of the third output portion 230C enmeshes with the corresponding input side bevel gear 252, to achieve a clutch connected state. When this occurs, in the other output portions 230 (the first output portion 230A and the second output portion 230B), the pins 235 are pressed by the cam face 211, and the output side bevel gears 234 separate from the corresponding input side bevel gears 252 to achieve a clutch disconnected state.

The selector 210 moves back and forth in the Y direction with forward and reverse rotation of the dial. Along the path of this movement, the pins 235 project out and fit into any one of the recessed portions 213A to 213C of the selector 210, and when this occurs, one of the output portions 230 out of the first to third output portions 230A to 230C is selected as described above. The output side bevel gear 234 of the selected output portion 230 enmeshes with the corresponding input side bevel gear 252 to achieve the clutch connected state.

In this clutch connected state, when the switch is switched ON and the motor 220 is actuated, the power of the motor 220 is transmitted from the input side bevel gear 252 to the output side bevel gear 234, rotating the overall output side clutch member 232, and thereby rotating the output shaft 231. The torque cable connected to the output shaft 231 of the selected output portion 230 accordingly rotates, achieving an actuated state. The rotation direction of the output shafts 231 and the torque cables can be switched by switching the rotation direction of the motor 220 using the switch.

According to the second exemplary embodiment, the respective output portions 230 are housed in the housing portions 260 formed at the case 201. In this housed state, when in the clutch connected state, the leading end wall portions 262 are contacted by the leading end faces 234a of the output side bevel gears 234 of the output side clutch members 232 that are biased in the direction of the input side bevel gears 252 by the coil springs 236. The stroke ends in the bias direction of the output side bevel gears 234 are accordingly restricted. Moreover, the leading end wall portions 262 are integrally formed to the case 201 that supports the input side bevel gears 252, thereby enabling the output side bevel gears 234 to always be positioned at uniform locations in the axial direction thereof so as to enmesh appropriately with the input side bevel gears 252. An appropriate backlash can accordingly be obtained in the enmeshed state between the output side bevel gears 234 and the input side bevel gears 252.

The leading end wall portions 262 are pressed by the output side bevel gears 234 biased by the coil springs 236, however since the leading end wall portions 262 are integrally formed to the case 201 together with the support portions 261 and the pairs of side wall portions 263, stress received due to this pushing is not concentrated on the leading end wall portions 262 and is dispersed around the overall case 201 through the support portions 261 and the pairs of side wall portions 263, thereby enabling deformation of the leading end wall portions 262 to be suppressed. The axial direction positions of the output side bevel gears 234 can accordingly be reliably positioned at uniform positions due to contacting the leading end wall portions 262. Moreover, in the present exemplary embodiment, the input side bevel gears 252 are also supported and positioned by the case 201 as well as the output side bevel gears 234, such that relative positional displacement between the two does not readily occur. Backlash can therefore always be stabilized with a high degree of precision in the enmeshed state of the output side bevel gears 234 with the input side bevel gears 252. The advantageous effects that tooth end bearing of the output side bevel gears 234 with respect to the input side bevel gears 252 can be suppressed, increasing durability, and enabling as a result a reduction in operation noise occurring during enmeshing to be obtained.

In the present exemplary embodiment, the output side bevel gears 234 make face-to-face contact with the leading end wall portions 262 in the enmeshed state of the output side bevel gears 234 with the input side bevel gears 252. Similarly to in the first exemplary embodiment, a pressure arising at face contact portions between the output side bevel gears 234 and the leading end wall portions 262 can accordingly be managed to an appropriate permissible value or below, and wear can be suppressed for both the output side bevel gears 234 and the leading end wall portions 262. Localized wear and uneven wear of the output side bevel gears 234 and the leading end wall portions 262 can also be prevented, enabling the durability of both the output side bevel gears 234 and the leading end wall portions 262 to be increased.

In the present exemplary embodiment, the leading end wall portions 262 that restrict the bias direction stroke ends of the output side bevel gears 234 also have the function of providing shaft support to the output side bevel gears 234, thereby enabling configuration to be simplified similarly to in the first exemplary embodiment.

Moreover, in the present exemplary embodiment, in the output side bevel gears 234 the leading ends of the pins 235 penetrate the through holes 262a in the leading end wall portions 262 and make sliding contact with the selector 210, enabling the configuration of the selector 210 to be simplified, similarly to in the first exemplary embodiment.

Note that in the second exemplary embodiment, the selector 210 of the present invention is configured so as to move along a straight line, however modification may be made to the present invention such that the selector 210 is a circular plate shaped rotating member with the peripheral face configuring the cam face, wherein the plural output portions 230 are disposed to the periphery of the cam face. Such a configuration of the selector similarly applies to the first exemplary embodiment.

What is claimed is:

1. A multi-shaft drive device comprising:
   a plurality of input side bevel gears that are supported so as to be rotatable with respect to a case and that rotate in response to transmission of power of a motor;
   a plurality of output side bevel gears that are each provided corresponding to each individual of the plurality of input side bevel gears, that are supported so as to be rotatable with respect to the case and to be capable of projecting forwards or retreating with respect to the input side bevel gears, that are biased in a direction to enmesh with the input side bevel gears, and that are respectively coupled to a plurality of movable mechanisms provided to a vehicle such that rotation force can be individually transmitted to the respective movable mechanisms;
   a selector that is provided so as to be movable with respect to the case and capable of making sliding contact with the plurality of output side bevel gears, that enmeshes a selected output side bevel gear out of the plurality of output side bevel gears with the corresponding input side bevel gear, and that separates the other output side bevel gears from the corresponding input side bevel gears; and
   a stopper that is provided at the case or at a retention member fixed to the case, that makes contact with the output side bevel gear that is enmeshed with the input side bevel gear and that restricts a stroke end in a bias direction of the output side bevel gear,
   wherein the selected output side bevel gear is separated from the selector in an enmeshed state of the selected output side bevel gear with the corresponding input side bevel gear.

2. The multi-shaft drive device of claim 1, wherein the selected output side bevel gear and the stopper make face-to-face contact in an enmeshed state of the selected output side bevel gear with the corresponding input side bevel gear.

3. The multi-shaft drive device of claim 1, wherein:
   the stopper includes a wall portion provided at the case or at the retention member; and
   a contact portion is provided to a leading end in a bias direction of the output side bevel gear and is supported by the wall portion so as to be rotatable with respect to the wall portion and capable of moving along a thrust direction in a state in which the contact portion penetrates a through hole formed in the wall portion.

4. The multi-shaft drive device of claim 3, wherein a leading end of the contact portion of the output side bevel gear makes sliding contact with the selector.

5. The multi-shaft drive device of claim 3, wherein the wall portion is formed at the retention member.

6. The multi-shaft drive device of claim 5, wherein the wall portion is formed with an open cross-section profile open to an output side bevel gear side, and the wall portion includes a pair of reinforcement portions formed so as to face both sides in a radial direction of the output side bevel gear.

7. The multi-shaft drive device of claim 3, wherein the wall portion is formed at the case.

8. The multi-shaft drive device of claim 7, wherein:
   the output side bevel gear is mounted so as to be rotatable together as a unit with an output shaft connected to the respective movable mechanisms and so as to be slidable in the thrust direction with respect to the output shaft;
   and the case further comprises:
      a support portion that rotatably supports the output shaft, and
      a pair of side wall portions integrally formed on the wall portion and the support portion and formed so as to face both sides in a radial direction of the output side bevel gear.

9. A multi-shaft drive device comprising:
   a plurality of input side bevel gears that are supported so as to be rotatable with respect to a case and that rotate in response to transmission of power of a motor;
   a plurality of output side bevel gears that are each provided corresponding to each individual of the plurality of input side bevel gears, that are supported so as to be rotatable with respect to the case and to be capable of projecting forwards or retreating with respect to the input side bevel gears, that are biased in a direction to enmesh with the input side bevel gears, and that are respectively coupled to a plurality of movable mechanisms provided to a vehicle such that a rotation force can be individually transmitted to the respective movable mechanisms;
   a selector that is provided so as to be movable with respect to the case and capable of making sliding contact with the plurality of output side bevel gears, that enmeshes a selected output side bevel gear out of the plurality of output side bevel gears with the corresponding input side bevel gear, and that separates the other output side bevel gears from the corresponding input side bevel gears;
   a stopper that is provided at the case or at a retention member fixed to the case, that makes contact with the output side bevel gear that is enmeshed with the input side bevel gear and that restricts a stroke end in a bias direction of the output side bevel gear, the stopper including a wall portion provided at the case or at the retention member; and
   a contact portion is provided to a leading end in a bias direction of the output side bevel gear and is supported by the wall portion so as to be rotatable with respect to the wall portion and capable of moving along a thrust direction in a state in which the contact portion penetrates a through hole formed in the wall portion.

* * * * *